(12) United States Patent
Kim et al.

(10) Patent No.: US 9,625,484 B2
(45) Date of Patent: Apr. 18, 2017

(54) SENSING MODULE AND ANGULAR VELOCITY SENSOR HAVING THE SAME

(71) Applicant: SAMSUNG ELECTRO-MECHANICS CO., LTD., Suwon-Si (KR)

(72) Inventors: Jong Woon Kim, Suwon-Si (KR); Jung Won Lee, Suwon-Si (KR); Seung Joo Shin, Suwon-Si (KR); Won Kyu Jeung, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 92 days.

(21) Appl. No.: 14/446,269

(22) Filed: Jul. 29, 2014

(65) Prior Publication Data

US 2015/0033852 A1 Feb. 5, 2015

(30) Foreign Application Priority Data

Jul. 31, 2013 (KR) .................. 10-2013-0091031

(51) Int. Cl.
*G01C 19/00* (2013.01)
*G01P 3/44* (2006.01)
*G01C 15/08* (2006.01)
*G01C 19/56* (2012.01)
*G01C 19/5712* (2012.01)

(52) U.S. Cl.
CPC ............ *G01P 9/04* (2013.01); *G01C 19/5712* (2013.01)

(58) Field of Classification Search
CPC G01C 19/56; G01C 19/5712; G01C 19/5705; G01C 19/574; G01C 19/5783; G01C 19/5733; G01C 19/04; G01P 15/093; G01P 15/125; G01P 15/12; G01P 15/09; G01P 2015/0805
USPC .............. 73/504.12, 504.14, 514.26, 514.32, 73/514.33, 514.34, 514.38
See application file for complete search history.

(56) References Cited

U.S. PATENT DOCUMENTS 4,598,585 A * 7/1986 Boxenhorn ........ G01C 19/5719
73/504.12
4,920,801 A * 5/1990 Church .................. G01P 15/18
73/514.16

(Continued)

OTHER PUBLICATIONS

Application history of U.S. Appl. No. 14/334,602, filed Jul. 17, 2014.*

*Primary Examiner* — Michael A Lyons
(74) *Attorney, Agent, or Firm* — NSIP Law

(57) ABSTRACT

An angular velocity sensor comprises a mass body part including a first mass body and a second mass body, an internal frame supporting the first mass body and the second mass body, one or more first flexible parts connecting the first mass body or the second mass body to the internal frame, one or more second flexible parts connecting the first mass body or the second mass body to the internal frame, an external frame supporting the internal frame, at least one third flexible part connecting the internal frame to the external frame, and at least one fourth flexible part connecting the internal frame to the external frame. At least one of the second flexible parts is connected to the first mass body in line with the center of gravity of the first mass body. At least one other of the second flexible parts is connected to an eccentric portion of the second mass body.

27 Claims, 17 Drawing Sheets

(56) References Cited

U.S. PATENT DOCUMENTS

| | | | |
|---|---|---|---|
| 7,343,801 B2 * | 3/2008 | Kapser | ................... F16N 11/08 73/514.32 |
| 2011/0146404 A1 | 6/2011 | Jeung | |
| 2015/0219456 A1 * | 8/2015 | Kim | ................... G01C 19/5705 73/504.12 |

* cited by examiner

SENSING MODULE AND ANGULAR VELOCITY SENSOR HAVING THE SAME

CROSS-REFERENCE TO RELATED APPLICATIONS

This application claims the benefit of Korean Patent Application No. 10-2013-0091031 filed on Jul. 31, 2013, entitled "Sensing Module and Angular Velocity Sensor Having the Same," which is hereby incorporated by reference in its entirety into this application.

BACKGROUND

1. Technical Field

Embodiments of the present invention generally relate to a sensing module and an angular velocity sensor having the same.

2. Description of the Related Art

Unless otherwise indicated herein, the materials described in this section are not prior art to the claims herein and are not admitted to be prior art by inclusion in this section.

Recently, an angular velocity sensor has been used in various applications including, for example, military applications such as an artificial satellite, a missile, an unmanned aircraft, vehicle applications such as an air bag, electronic stability control (ESC), a black box for a vehicle, hand shaking prevention for a camcorder, motion sensing for a mobile phone or a game machine, navigation, or the like.

The angular velocity sensor generally adopts a configuration in which a mass body is adhered to an elastic substrate such as a membrane, in order to measure angular velocity. Through the configuration, the angular velocity sensor may calculate the angular velocity by measuring Coriolis force applied to the mass body.

An exemplary scheme of measuring angular velocity using the angular velocity sensor is as follows. First, the angular velocity may be calculated using the Coriolis force represented by the equation $F=2m\Omega \times v$, where F denotes the Coriolis force applied to the mass body, m denotes the mass of the mass body, $\Omega$ denotes the angular velocity to be measured, and v denotes the motion velocity of the mass body. Since the motion velocity v and the mass m of the mass body are already known values, the angular velocity $\Omega$ can be calculated by detecting the Coriolis force (F) applied to the mass body.

The angular velocity sensor includes a piezoelectric material disposed on a membrane (a diaphragm) in order to drive a mass body or sense displacement of the mass body. In order to measure the angular velocity using the angular velocity sensor, the resonant frequency in a driving mode may be substantially matched with the resonant frequency in a sensing mode.

PATENT DOCUMENT (Patent Document 1) US Patent Application Publication No. 2011/0146404

SUMMARY

Some embodiments of the present invention may provide a sensing module for a sensor in which mass body part includes a first mass body connected to correspond to the center of gravity and a second mass body connected to be spaced apart from the center of gravity to produce different displacement, such that physical quantity on multiple axes can be sensed simultaneously.

Further, some embodiments of the present invention may provide an angular velocity sensor integrated with a driving unit capable of removing interference between the driving mode and sensing mode and reducing influence due to manufacturing error in such a manner that a plurality of frames is provided and the frames and mass bodies are driven by one driving unit so that driving displacement and sensing displacement are separately generated to allow the mass bodies to move in a particular direction.

Additionally, some embodiments of the present invention may provide an angular velocity sensor capable of sensing three-axes angular velocity in such a manner that a mass body inserted in a frame includes a first mass body connected to correspond to the center of gravity and a second mass body connected to be spaced apart from the center of gravity, and the driving and displacement of the first and second mass bodies according to the driving of the frame are different.

Some embodiments of the present invention may provide an angular velocity sensor in which driving displacement is increased by the first mass bodies being disposed both sides of the second mass body accordingly, to improve sensitivity.

According to a preferred embodiment of the present invention, there is provided a sensing module for a sensor, the sensing module including: a mass body part including a first mass body and a second mass body; a frame supporting the first mass body and the second mass body; one or more first flexible parts connecting the first mass body and/or the second mass body to the frame; and one or more second flexible parts connecting the first mass body and/or the second mass body to the frame. At least one of the second flexible parts may be connected to the first mass body in line with the center of the gravity of the first mass body. At least one of the second flexible parts may connect the frame to an eccentric portion of the second mass body.

The first flexible part and the second flexible part may be perpendicular to each other.

The first flexible part may be a beam that has a predetermined thickness in the z-axis direction and has a plane defined by the x-axis and y-axis, and a width of the first flexible part in the x-axis direction may be larger than a thickness of the first flexible part in the z-axis direction.

The second flexible part may be a hinge that has a predetermined thickness in the y-axis direction and has a plane defined by the x-axis and z-axis, and a width of the second flexible part in the z-axis direction is larger than a thickness of the second flexible part in the y-axis direction.

According to a first preferred embodiment of the present invention, there is provided an angular velocity sensor including: a mass body part including a first mass body and a second mass body; an internal frame supporting the first mass body and the second mass body; one or more first flexible parts connecting the first mass body and/or the second mass body to the internal frame; one or more second flexible parts connecting the first mass body and/or the second mass body to the internal frame, an external frame supporting the internal frame; at least one third flexible part connecting the internal frame to the external frame; and at least one fourth flexible part connecting the internal frame to the external frame. At least one of the second flexible parts may be connected to the first mass body in line with the center of gravity of the first mass body. At least one of the second flexible parts may connect the internal frame to an eccentric portion of the second mass body.

The fourth flexible part may be disposed in line with the center of the gravity of the second mass body.

The first flexible part and the second flexible part may be perpendicular to each other.

The third flexible part and the fourth flexible part may be perpendicular to each other.

The third flexible part and the first flexible part may be perpendicular to each other.

The fourth flexible part and the second flexible part may be perpendicular to each other.

The first flexible part may be a beam that has a predetermined thickness in the z-axis direction and has a plane defined by the x-axis and y-axis, and a width of the first flexible part in the x-axis direction may be larger than a thickness of the first flexible part in the z-axis direction.

The first flexible parts may connect both ends of the first mass body in the y-axis direction to the internal frame.

The first flexible part may connect one end of the second mass body in the y-axis direction to the internal frame.

The second flexible part may be a hinge that has a predetermined thickness in the y-axis direction and has a plane defined by the x-axis and z-axis, and a width of the second flexible part in the z-axis direction is larger than a thickness of the second flexible part in the y-axis direction.

The second flexible part may be connected to a center mass body so as to be in line with the center of gravity of the first mass body in the y-axis direction.

The second flexible part may be connected to a portion of the second mass body which is spaced apart from the center of the gravity of the second mass body in the y-axis.

The third flexible part may be a beam that has a predetermined thickness in the z-axis direction and has a plane defined by the x-axis and y-axis, and a width of the third flexible part in the y-axis direction may be larger than a thickness of the third flexible part in the z-axis direction.

The fourth flexible part may be a hinge that has a predetermined thickness in the x-axis direction and has a plane defined by the y-axis and z-axis, and a width of the fourth flexible part in the z-axis direction is larger than a thickness of the fourth flexible part in the x-axis direction.

The third flexible part has driving unit to drive the internal frame, the internal frame is rotatable about the axis to which the fourth flexible part is connected with respect to the external frame, if the internal frame is driven by the driving unit of the third flexible part.

The third flexible part may generate bending stress and the fourth flexible part generates torsion stress, if the internal frame is rotated on the axis to which the fourth flexible part is connected.

The first and second mass bodies may be rotated on the axis to which the second flexible part is connected with respect to the internal frame, if the internal frame is rotated on the axis to which the fourth flexible part is connected.

The first flexible part may generate bending stress and the second flexible part generates torsion stress, if the first and second mass bodies are rotated.

The first mass body may include a first one-side mass body located beside one side of the second mass body, and a first other-side mass body located beside another side of the second mass body.

The first mass body may have first flexible parts connected to both ends in the y-axis direction, and the second mass body may have the first flexible part connected to one end in the y-axis direction.

The first mass body and the second mass body may have second flexible parts connected to both sides in the x-axis direction.

The fourth flexible part may be connected to the center of the internal frame such that the first one-side mass body and the first other-side mass body are arranged symmetrically.

According to a second preferred embodiment of the present invention, there is provided an angular velocity sensor including: a mass body part including a first mass body and a second mass body; an internal frame supporting the first mass body and the second mass body; one or more first flexible parts connecting the first mass body and/or the second mass body to the internal frame; one or more second flexible parts connecting the first mass body and/or the second mass body to the internal frame, an external frame supporting the internal frame; at least one third flexible part connecting the internal frame to the external frame; and at least one fourth frame connecting the internal frame to the external frame. The second mass body may include a second one-side mass body and a second other-side mass body inserted into one spatial part of the internal frame such that they are arranged symmetrically. At least one of the second flexible parts may be connected to the first mass body in line with the center of the gravity of the first mass body. At least one of the second flexible parts may connect the internal frame to an eccentric portion of the second one-side mass body and the second other-side mass body.

According to a third preferred embodiment of the present invention, there is provided an angular velocity sensor including: a mass body part including a first mass body and a second mass body; an internal frame supporting the first mass body and the second mass body; one or more first flexible parts connecting the first mass body and/or the second mass body to the internal frame; one or more second flexible parts connecting the first mass body and/or the second mass body to the internal frame, an external frame supporting the internal frame; at least one third flexible part connecting the internal frame to the external frame; and at least one fourth flexible part connecting the internal frame to the external frame. At least one of the second flexible parts may be connected to the first mass body in line with the center of gravity of the first mass body. At least one of the second flexible parts may connect the internal frame to an eccentric portion of the second mass body. The second flexible parts connecting the first mass body to the internal frame may be arranged on the same extended line. The second flexible parts connecting the second mass body to the internal frame may be arranged on the same extended line.

According to a fourth preferred embodiment of the present invention, there is provided an angular velocity sensor including: a mass body part including a first mass body and a second mass body with a hollow part; an internal frame supporting the first mass body and the second mass body; one or more first flexible parts connecting the first mass body and/or the second mass body to the internal frame; one or more second flexible parts connecting the first mass body and/or the second mass body to the internal frame, an external frame supporting the internal frame; at least one third flexible part connecting the internal frame to the external frame; and at least one fourth flexible part connecting the internal frame to the external frame. At least one of the second flexible parts may be connected to the first mass body in line with the center of gravity of the first mass body. At least one of the second flexible parts may be connect the internal frame to an eccentric portion of the second mass body.

BRIEF DESCRIPTION OF THE DRAWINGS

Embodiments of the present invention will be more clearly understood from the following description taken in conjunction with the accompanying drawings, in which.

DESCRIPTION OF THE PREFERRED EMBODIMENTS

Figure 1:
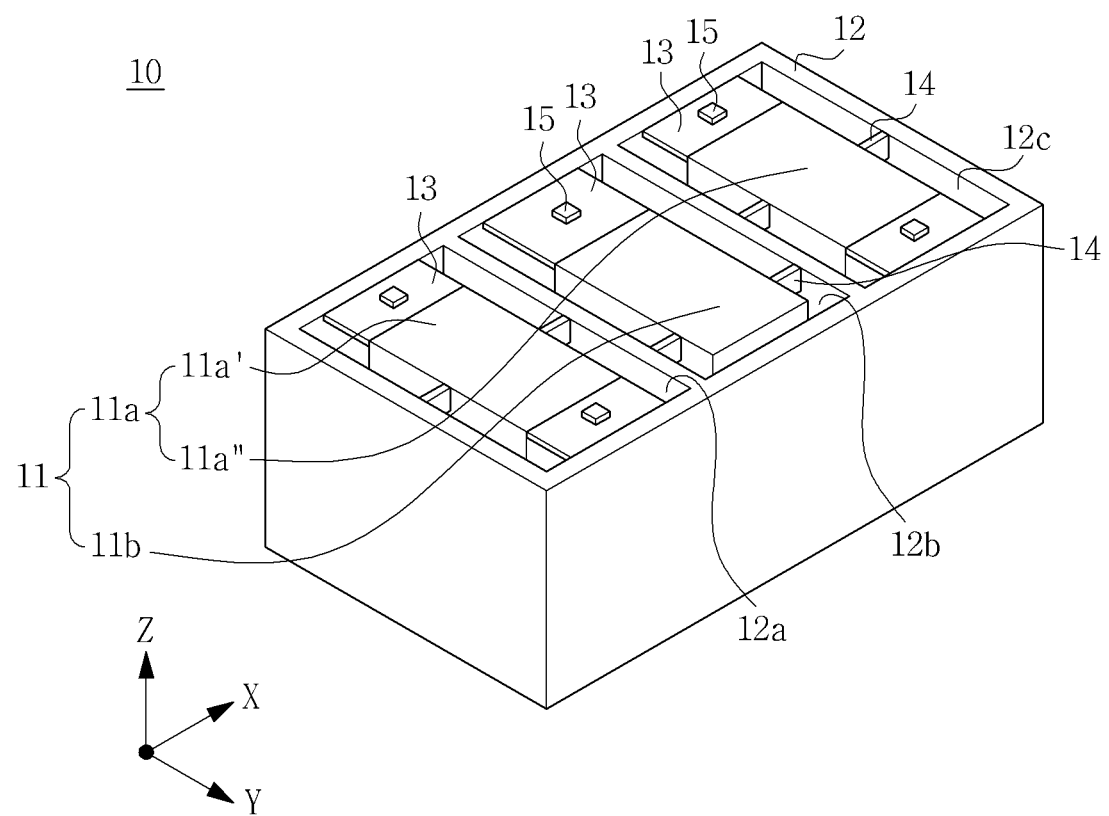
FIG. 1 is a perspective view schematically showing a sensing module for a sensor according to a preferred embodiment of the present invention.

Embodiments of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. As used in this description and the appended claims, the singular forms "a", "an" and "the" are intended to include the plural forms as well, unless the context clearly indicates otherwise. Further, in the description of embodiments of the present invention, when the detailed description of the related art would obscure the gist of the present invention, the description thereof will be omitted.

Hereinafter, preferred embodiments of the present invention will be described with reference to the attached drawings.

FIG. 1 is a perspective view schematically showing a sensing module for a sensor according to a preferred embodiment of the present invention. The sensing module 10 may include a mass body part 11, a frame 12, a first flexible part 13 and a second flexible part 14.

The first and second flexible parts 13 and 14 optionally include a sensing unit 15. The sensing unit 15 may use a piezoelectric manner, a piezoresistive manner, a capacitive manner, an optical manner, but is not limited thereto.

The mass body part 11 may be displaced by the Coriolis force and include a first mass body 11a and a second mass body 11b.

One of the second flexible parts 14 may be connected to the first mass body 11a in line with the center of gravity of the first mass body 11a, while another second flexible part 14 may be connected to the second mass body 11b such that it is spaced apart from the center of gravity. The second flexible part 14 connects a frame 12 to an eccentric portion of the second mass body 11b.

In addition, the first mass body 11a and the second mass body 11b may have the same size.

The first mass body 11a includes a first one-side mass body 11a' located beside one side of the second mass body 11b and a first other-side mass body 11a" located beside the other side of the second mass body 11b. The first one-side mass body 11a' and the first other-side mass body 11a" may have the same size, and be disposed on either side of the second mass body 11b symmetrically.

The first mass body 11a is connected to the frame 12 by the first and second flexible parts 13 and 14.

The first mass body 11a may have a generally rectangular pillar shape, but not limited to the above-mentioned shape. The first mass body 11a may have any shape known in the art.

In addition, the first flexible part 13 is connected to only one side of the second mass body 11b in the y-axis direction. Further, one or more second flexible parts 14 are connected to other sides of the second mass body 11b in the x-axis direction. That is, one side of the second mass body 11b in the y-axis direction is connected to the frame 12 by the first flexible part 13 and the other side of the second mass body 11b is connected to the frame 12 by the second flexible part 14.

The frame 12 may be partitioned into at least three spatial parts 12a, 12b and 12c so that the first mass body 11a and the second mass body 11b are inserted thereinto.

The frame 12 provides the space in which the first and second mass bodies 11a and 11b connected by the first and second flexible parts 13 and 14 to the frame 12 are displaceable, and is a reference for the displacement by the first and second mass bodies 11a and 11b.

The first one-side mass body 11a' and the first other-side mass body 11a" may be inserted into the spatial parts 12a and 12c, respectively, such that they are arranged symmetrically with respect to the second mass body 11b.

In addition, the frame 12 may have a rectangular pillar shape in which a rectangular pillar shaped hollow is at the center, but not limited thereto.

Either or both end parts of the first mass body 11a and the second mass body 11b in the x-axis direction may be connected in line with the frame 12 by the second flexible parts 14. For example, the second flexible parts 14 may be connected in line with the center of the first mass body 11a in the y-axis direction, and the second flexible parts 14 may be connected to portions of the second mass body 11b spaced apart from the center in the y-axis direction.

That is, the second flexible part 14 connects the frame 12 to the eccentric portion of the second mass body 11b.

The first mass body 11a and the second mass body 11b are connected to the frame 12 in the y-axis direction by the first flexible parts 13. The first mass body 11a may have the first flexible part 13 connected to one or both ends thereof, and the second mass body 11b may have the first flexible part 13 connected to only one end thereof.

Figure 25:
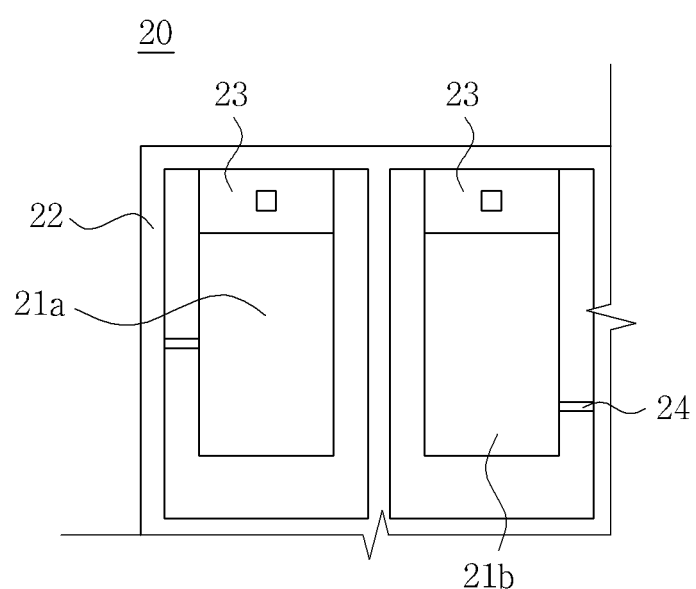
FIG. 25 is a partial plan view schematically showing a sensing module for a sensor according to another preferred embodiment of the present invention.

As shown in FIG. 25 showing another embodiment, a first flexible part 23 may be connected to only one end of the first mass body 11a and/or the second mass body 11b, and a second flexible part 24 may be connected to only one side of the first mass body 11a and the second mass body 11b.

Further, the first flexible part 13 is a beam having a predetermined thickness in the z-axis direction and having the plane defined by the x-axis and y-axis. For example, the first flexible part may have a width in the x-axis direction larger than a thickness in the z-axis direction.

The sensing unit 15 may be formed on the first flexible part 13. When viewed from the x-y plane, the first flexible part 13 may be wider than the second flexible part 14, and the first flexible part 13 may have thereon the sensing unit 15 to sense the displacement of the first mass body 11a and/or the second mass body 11b.

The second flexible part 14 is a hinge having a predetermined thickness in the y-axis direction and having the plane defined by the x-axis and z-axis. The second flexible part 14 may have a width in the z-axis direction larger than a thickness in the y-axis direction.

In addition, the first flexible part 13 and the second flexible part 14 may be disposed perpendicularly to each other. In an exemplary embodiment, the first flexible part 13 is connected to the mass body part 11 and the frame 12 in the y-axis direction, and the second flexible part 14 is connected to the mass body part 11 and the frame 12 in the x-axis direction.

If the second flexible part 14 has a width in the z-axis direction larger than the thickness in the y-axis direction, the mass bodies 11a and 11b are limited from being rotated on the y-axis or translated in the z-axis direction, but may be relatively freely rotated on the x-axis. The mass bodies 11a and 11b are inserted into the frame 12 and rotatable about the x-axis direction. The second flexible part 14 serves as a hinge for the above-mentioned rotation.

With this configuration, when the frame 12 is displaced, the Coriolis force is applied to the first and second mass bodies 11a and 11b, and displacement is caused by bending of the first flexible part 13 and the torsion of the second flexible part 14 with respect to the frame 12. By virtue of the displacement or the velocity of the mass bodies, an angular velocity or acceleration may be detected.

A method for calculating an angular velocity by a sensing module for a sensor according to a preferred embodiment of the present invention will be described in detail with regard to an angular velocity sensor.

Figure 2:
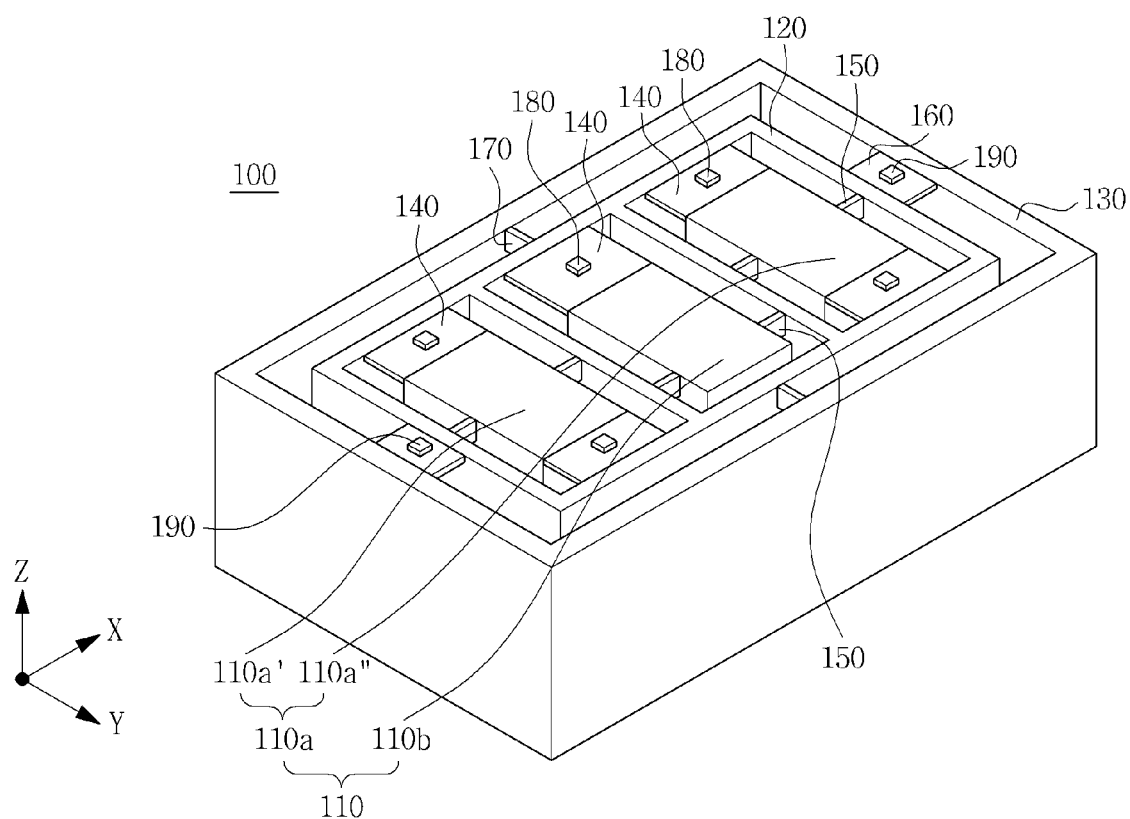
FIG. 2 is a perspective view schematically showing an angular velocity sensor according to a first preferred embodiment of the present invention.
Figure 3:
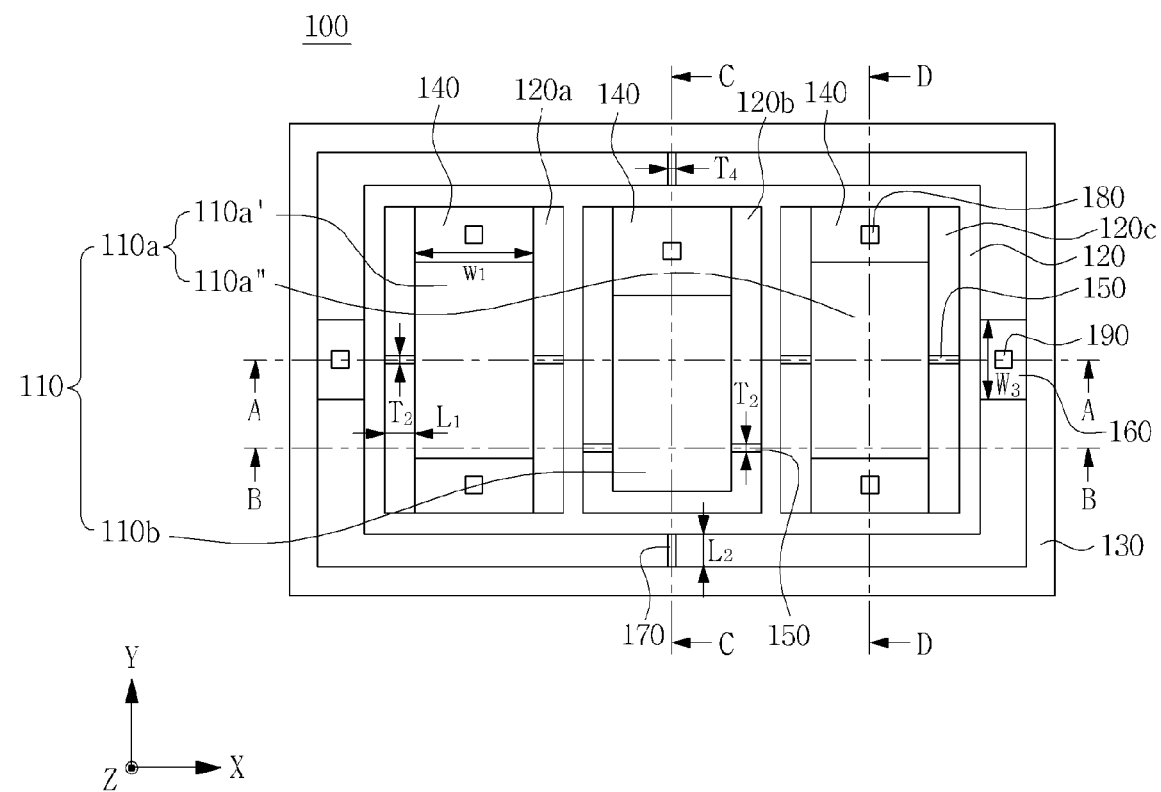
FIG. 3 is a plan view of the angular velocity sensor shown in FIG. 2.

FIG. 2 is a perspective view schematically showing an angular velocity sensor according to a first preferred embodiment of the present invention, and FIG. 3 is a plan view of an angular velocity sensor shown in FIG. 2.

The angular velocity sensor 100 may include a mass body part 110, an internal frame 120, an external frame 130, a first flexible part 140, a second flexible part 150, a third flexible parts 160, and a fourth flexible part 170.

The first flexible part 140 and the second flexible part 150 may be provided with a sensing unit 180, and the third flexible part 160 and the fourth flexible part 170 may be are optionally provided with a driving unit 190.

The mass body part 110 may be displaced by the Coriolis force and include a first mass body 110a and a second mass body 110b.

The second flexible part 150 may be connected to the first mass body 110a in line with the center of gravity of the first mass body 110a, while the second flexible part 150 may be connected to the second mass body 110b spaced apart from the center of gravity.

For example, the second flexible part 150 connects the internal frame 120 to an eccentric portion of the second mass body 110b.

The first mass body 110a and the second mass body 110b may have the same size.

The first mass body 110a may include a first one-side mass body 110a' located beside one side of the second mass body 110b and first other-side mass body 110a" located beside the other side of the second mass body 110b. The first one-side mass body 110a' and the first other-side mass body 110a" may have the same size, and be disposed on either side of the second mass body 110b symmetrically.

The first mass body 110a may be connected to the internal frame 120 by the first and second flexible parts 140 and 150.

The first mass body 110a may be displaced with reference to the internal frame 120 by bending of the first flexible part 140 and the torsion of the second flexible part 150 when the Coriolis force acts thereon. The first mass body 110a is rotatable on the x-axis with respect to the inner frame 120. A detailed example will be described below.

The first mass body 110a is shown in FIG. 2 as having a generally rectangular pillar shape, but is not limited thereto. The first mass body 110a may have any shape known in the art.

The first flexible part 140 may be connected to only one end of the second mass body 110b in the y-axis direction. The second flexible part 150 may be connected to another end of the second mass body 110b in the x-axis direction. In an exemplary embodiment, one side of the second mass body 110b in the y-axis direction is connected to the inner frame 120 by the first flexible part 140 and other sides of the second mass body 110b are connected to the inner frame 120 by the second flexible parts 150.

The internal frame 120 supports the mass body part 110. For example, the mass body part 110 may be inserted into the internal frame 120, and is connected to the internal frame 120 by the first flexible part 140 and/or the second flexible part 150. The internal frame 120 provides the space in which the mass body part 110 is displaceable, and is a reference for the displacement by the mass body part 110. The internal frame 120 may cover only a portion of the mass body part 110.

Further, the external frame 130 may support the internal frame 120. For example, the external frame 130 is provided at an outer side of the internal frame 120, has a gap with the internal frame 120, and is connected to the internal frame 120 by the third flexible part 160 and/or the fourth flexible part 170. Accordingly, the internal frame 120 and the mass body part 110 connected to the internal frame 120 are supported by the external frame 130 such that they float so as to be displaceable. The external frame 130 may cover only a portion of the internal frame 120.

In an embodiment, the sensing unit 180 and/or the driving unit 190 are formed on one surface of the first flexible part 140 and/or the third flexible part 160.

Figure 4:
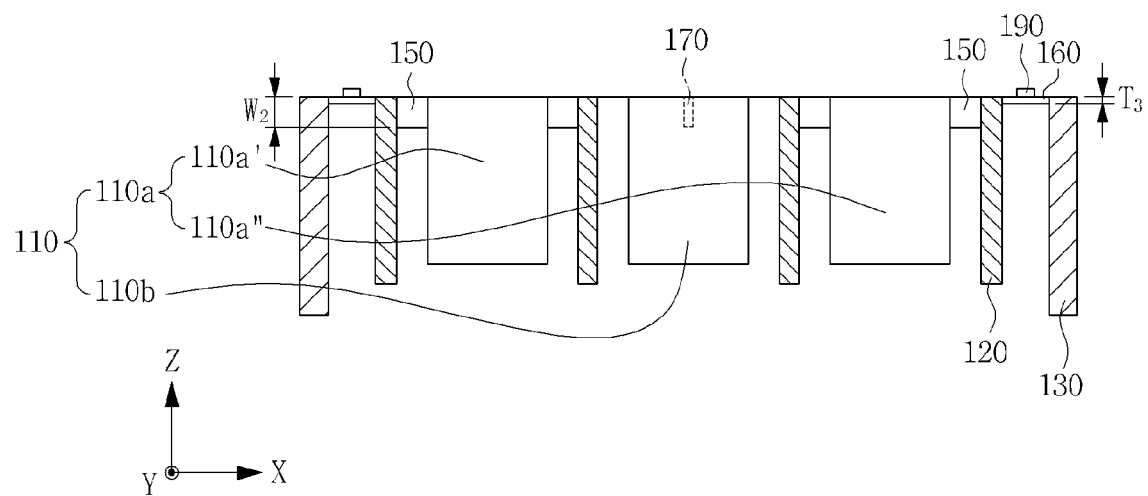
FIG. 4 is a schematic cross-sectional view of the angular velocity sensor shown in FIG. 3 taken along line A-A.
Figure 5:
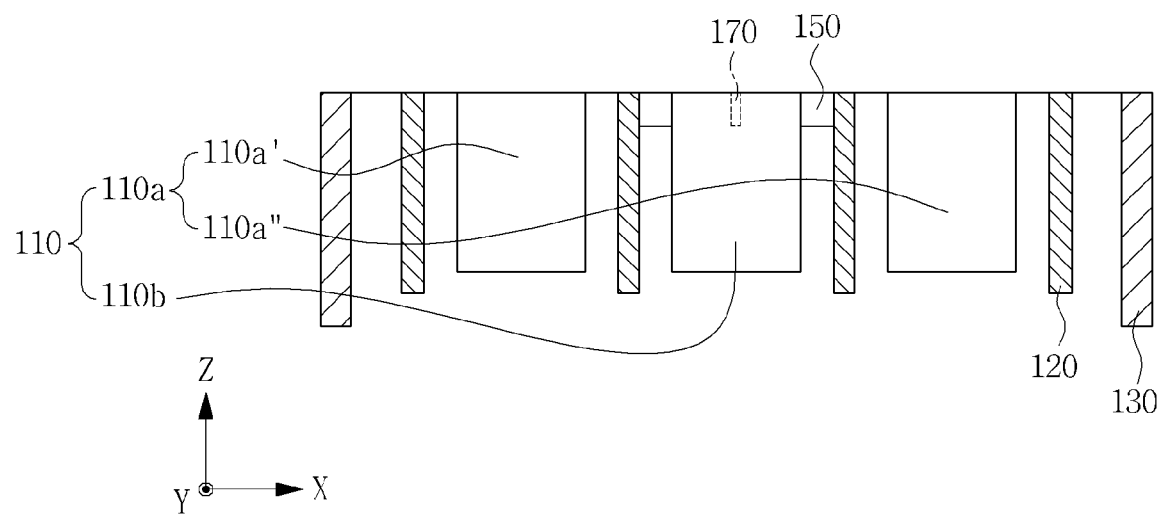
FIG. 5 is a cross-sectional view of the angular velocity sensor shown in FIG. 3 taken along line B-B.
Figure 6:
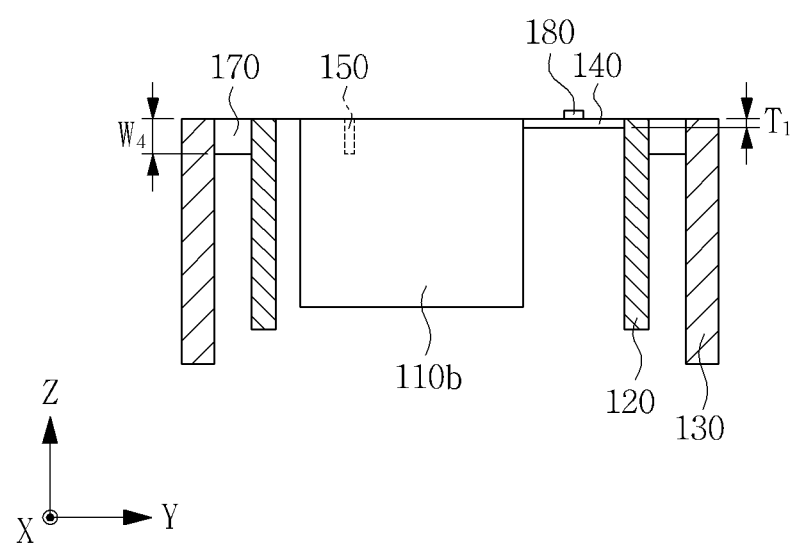
FIG. 6 is a cross-sectional view of the angular velocity sensor shown in FIG. 3 taken along line C-C.
Figure 7:
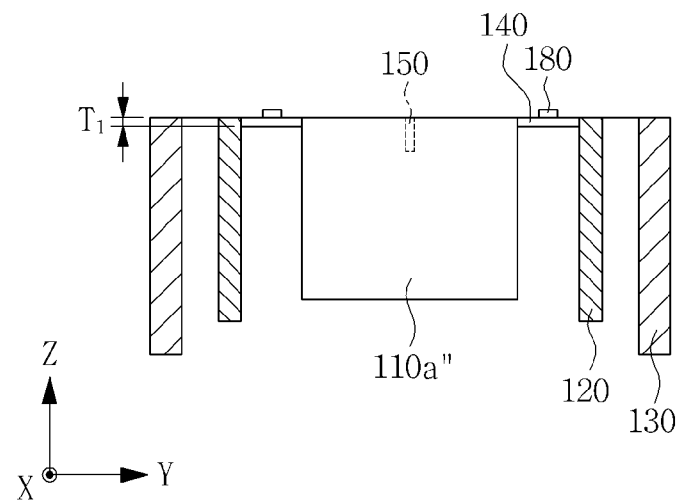
FIG. 7 is a cross-sectional view of the angular velocity sensor shown in FIG. 3 taken along line D-D.

FIG. 4 is a cross-sectional view of the angular velocity sensor shown in FIG. 3 taken along line A-A, FIG. 5 is a cross-sectional view of the angular velocity sensor shown in FIG. 3 taken along line B-B, FIG. 6 is a cross-sectional view of the angular velocity sensor shown in FIG. 3 taken along line C-C, and FIG. 7 is a cross-sectional view of the angular velocity sensor shown in FIG. 3 taken along line D-D.

In the following, with reference to FIGS. 4 to 7 in addition to FIGS. 2 and 3, examples of constitutional features, shapes and relationships between elements of the angular velocity sensor 100 according to a first preferred embodiment of the present invention will be described in detail.

The inner frame 120 may be partitioned into at least three spatial parts 120a, 120b and 120c so that the first mass body 110a and the second mass body 110b are inserted thereinto.

The inner frame 120 provides the space in which the first and second mass bodies 110a and 110b connected by the first and second flexible parts 140 and 150 to the internal frame 120 are displaceable, and is a reference for the displacement by the first and second mass body 110a and 110b.

The first one-side mass body 110a' and the first other-side mass body 110a" are inserted into the spatial parts 120a and 120c of the internal frame 120, respectively, such that they are arranged symmetrically with respect to the second mass body 110b.

In addition, the inner frame 120 may have a rectangular pillar shape in which a rectangular pillar shaped hollow is at the center, but is not limited thereto.

Either end parts of the first mass body 110a and the second mass body 110b in the x-axis direction are connected to the inner frame 120 by the second flexible parts 150. One or some of the second flexible parts 150 are connected to the center of the first mass body 110a in the y-direction, and one or some of second flexible parts 150 are connected to the second mass body 110b such that it is spaced apart from the center in the y-direction.

The first mass body 110a and the second mass body 110b are connected to the inner frame 120 in the y-axis direction by the first flexible parts 140. The first mass body 110a has the first flexible part 140 connected to one or both ends thereof, and the second mass body 110b has the first flexible part 140 connected to only on one end thereof.

The first flexible part 140 may be a beam having a predetermined thickness in the z-axis direction and having the plane defined by the x-axis and y-axis. For instance, the first flexible part has a width $W_1$ in the x-axis direction larger than a thickness $T_1$ in the z-axis direction.

The sensing unit 180 may be formed on the first flexible part 140. When viewed from the x-y plane, the first flexible part 140 is wider than the second flexible part 150, and the first flexible part 140 may have thereon the sensing unit 180 to sense the displacement of the first mass body 110a and/or the second mass body 110b.

In addition, the sensing unit 180 may be formed in a piezoelectric scheme, a piezoresistive scheme, a capacitive scheme, an optical scheme, or the like, but is not particularly limited thereto.

The second flexible part 150 may be a hinge having a predetermined thickness in the y-axis direction and having the plane defined by the x-axis and z-axis. For example, the second flexible part 150 may have a width $W_2$ in the z-axis direction larger than a thickness $T_2$ in the y-axis direction.

The first flexible part 140 and the second flexible part 150 are disposed perpendicularly to each other. That is, the first flexible part 140 connects the mass body part 110 to the inner frame 120 in the y-axis direction, and the second flexible part 150 connects the mass body part 110 to the inner frame 120 in the x-axis direction.

If the second flexible part 150 has a width $W_2$ in the z-axis direction larger than the thickness $T_2$ in the y-axis direction, the mass bodies 110a and 110b are limited from being rotated on the y-axis or translated in the z-axis direction, but may be relatively freely rotated on the x-axis. That is, the mass bodies 110a and 110b are inserted into the inner frame 120 and rotatable about the x-axis direction. The second flexible part 150 serves as a hinge for the above-mentioned rotation.

The external frame 130 is provided at an outer side of the internal frame 120, has a gap with the internal frame 120, and is connected to the internal frame 120 by the third flexible part 160 and/or the fourth flexible part 170.

The external frame 130 supports the third flexible part 160 and the fourth flexible part 170 to allow a space in which the internal frame 120 may be displaced to be secured and becomes a basis when the internal frame 120 is displaced. The external frame 130 may have a rectangular pillar shape in which it has a rectangular pillar shaped hollow formed at the center thereof, but is not limited thereto.

The third flexible part 160 may be a beam having a predetermined thickness in the z-axis direction and having the plane defined by the x-axis and y-axis. For example, the third flexible part 160 has a width W3 in the y-axis direction larger than a thickness T3 in the z-axis direction.

The third flexible part 160 may be disposed in a direction perpendicular to the first flexible direction 140.

In addition, the third flexible part 160 has a driving unit 190 formed thereon. The driving unit 190, which is to drive the internal frame 120 and the mass body 110, may use, for example, but is not limited to, a piezoelectric scheme, a capacitive scheme, or the like.

The fourth flexible part 170 may be a hinge having a predetermined thickness in the x-axis direction and having the plane defined by the y-axis and the z-axis. For instance, the fourth flexible part 170 may have a width $W_4$ in the z-axis direction larger than a thickness $T_4$ in the x-axis direction.

The third flexible part 160 and the fourth flexible part 170 may be disposed perpendicularly to each other. For instance, the third flexible part 160 may be connected to the internal frame 120 and the external frame 130 in the x-axis direction, and the fourth flexible part 170 may be connected to the internal frame 120 and the external frame 130 in the y-axis direction.

The fourth flexible part 170 may be disposed in line with the center of gravity of the second mass body part 110b. If the fourth flexible part 170, which is a driving rotation axis of the internal frame 120, is spaced apart from the center of gravity of the second mass body 110b, the inertial force applied to the second mass body 110b in the z-axis direction may result in the displacement of the second mass body 110b even when there is no angular velocity input such that noise is generated.

Further, the third and fourth flexible parts 160 and 170 connect the external frame 130 to the inner frame 120 such that the inner frame 120 is displaceable with respect to the external frame 130.

For example, the third flexible part 160 connects the inner frame 120 to the external frame 130 in the x-axis direction, and the fourth flexible part 170 connects the inner frame 120 to the external frame 130 in the y-axis direction.

Since the third flexible part 160 is relatively wide as compared to the fourth flexible part 170 in the x-y plane, the third flexible part 160 may be provided with the driving unit 190 to drive the internal frame 120.

The driving unit 190 may drive the inner frame 120 to be rotated on the y-axis. For instance, the driving unit 190 may use a piezoelectric scheme, a capacitive scheme, or the like, but is not particularly limited thereto.

Since the fourth flexible part 170 has a width $W_4$ in the z-axis direction larger than a thickness $T_4$ in the x-axis direction, the inner frame 120 is limited from being rotated on the x-axis or translated in the z-axis direction, but may be relatively freely rotated on the z-axis. The internal frame 120 is fixed to the external frame 130 so as to be rotatable on the y-axis, and the fourth flexible part 170 serves as a hinge for the rotation.

By disposing the first flexible part 140, the second flexible part 150, the third flexible part 160, and the fourth flexible part 170 as described above, the first flexible part 140 and the third flexible part 160 may be disposed perpendicularly to each other. In addition, the second flexible part 150 and the fourth flexible part 170 may be disposed perpendicularly to each other.

The first flexible part 140 and the third flexible part 160 may be disposed in parallel to each other.

In addition, the second flexible part 150 and the fourth flexible part 170 of the angular velocity sensor 100 may have a hinge shape with a rectangular cross-section or a torsion bar shape with a circular cross-section, or any possible shape.

The angular velocity sensor 100 according to the first preferred embodiment of the present invention may not include the third flexible part 160, and may form the driving unit 190 on the fourth flexible part 170.

In the following, examples of directions in which the mass body in the angular velocity sensor according to the first preferred embodiment of the present invention may move will be described in detail with reference to the drawings.

Figure 8:
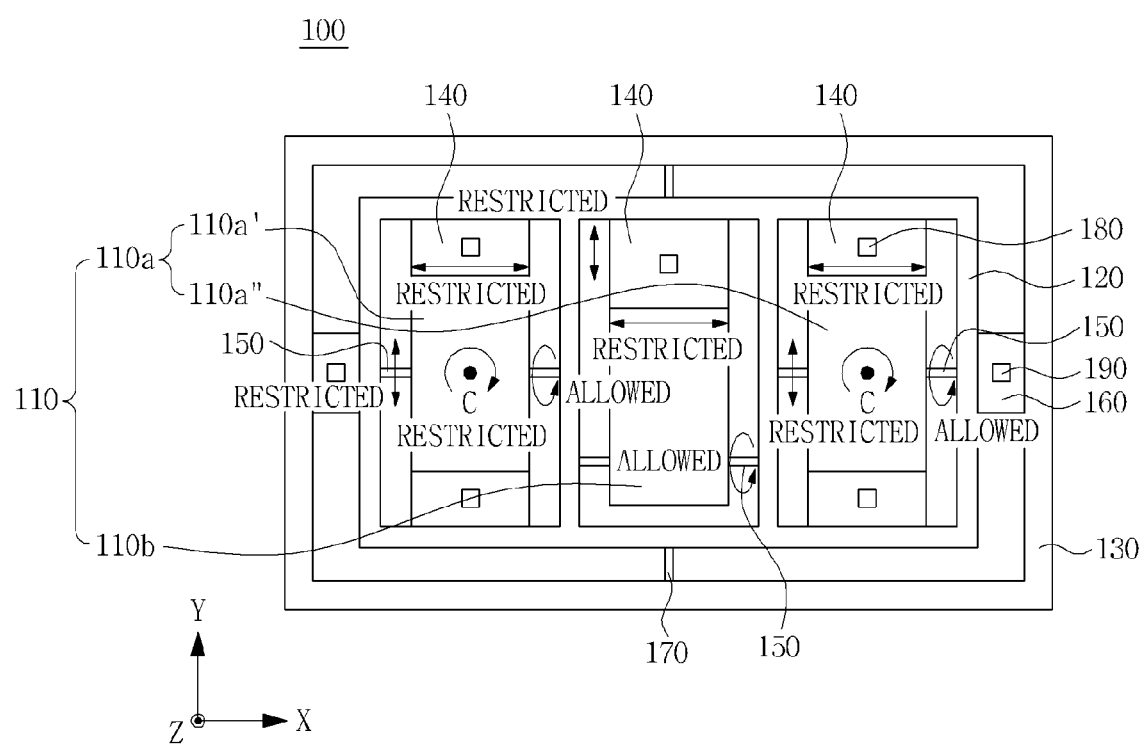
FIG. 8 is a plan view showing directions in which the first mass body and the second mass body are allowed to move in the angular velocity sensor shown in FIG. 3.
Figure 9:
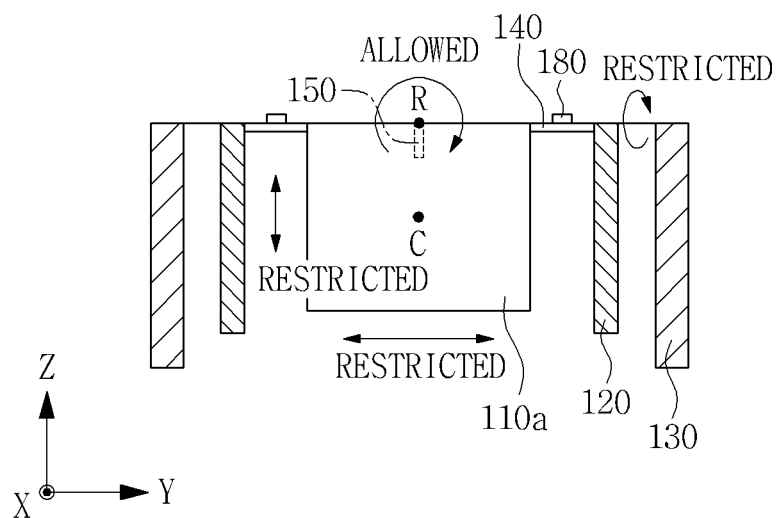
FIG. 9 is a cross-sectional view showing directions in which the first mass body is allowed to move in the angular velocity sensor shown in FIG. 7.
Figure 10:
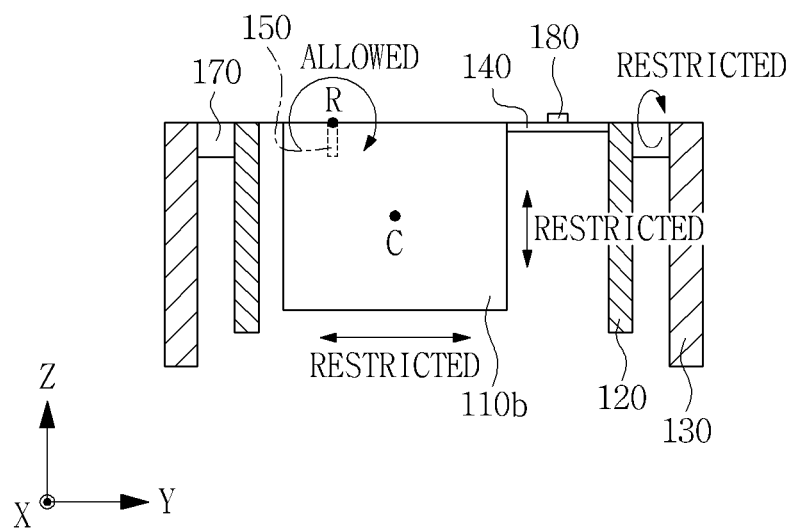
FIG. 10 is a cross-sectional view showing directions in which the second mass body is allowed to move in the angular velocity sensor shown in FIG. 6.

FIG. 8 is a plan view showing directions in which the first mass body 110a and the second mass body 110b are allowed to move in the angular velocity sensor 100 shown in FIG. 3, FIG. 9 is a cross-sectional view showing directions in which the first mass body 110a is allowed to move in the angular velocity sensor 100 shown in FIG. 7, and FIG. 10 is a cross-sectional view showing directions in which the second mass body 110b is allowed to move in the angular velocity sensor 100 shown in FIG. 6.

First, since the second flexible part 150 have a width $W_2$ in the z-axis direction larger than a thickness $T_2$ in the y-axis direction, the first mass body 110a and the second body 110b are limited from being rotated on the y-axis or translated in the z-axis direction, but may be relatively freely rotated on the x-axis with respect to the inner frame 120.

Specifically, as the rigidity of the second flexible part 150 when it is rotated on the y-axis is larger than the rigidity when it is rotated on the x-axis, the first and second mass bodies 110a and 110b may be more freely rotated on the x-axis but be limited from being rotated on the y-axis.

Similarly, as the rigidity of the second flexible part 150 when it is translated in the z-axis direction is bigger than the rigidity when it is rotated in the x-axis, the first and second mass bodies 110a and 110b may be more freely rotated on the x-axis, but be limited from being moved along the z-axis direction.

For instance, as a value of (the rigidity of the second flexible part 150 when it is rotated on the y-axis or the rigidity of the second flexible part 140 when it is moved along the z-axis direction)/(the rigidity of the second flexible part 140 when it is rotated on the x-axis) increases, the first and second mass bodies 110a and 110b may be more freely rotated on the x-axis, but be limited from being rotated on the y-axis or moved along the z-axis direction, with respect to the inner frame 120.

Exemplary relationships among the width $W_2$ of the second flexible part 150 in the z-axis direction, the length $L_1$ thereof in the x-axis direction and the thickness $T_2$ thereof in the y-axis direction for the rigidities thereof in each of the directions may be represented as follows, with reference to FIGS. 3 and 7.

(1) The rigidity of the second flexible part 150 when it is rotated on the y-axis or the rigidity thereof when it is translated in the z-axis direction is proportional to $W_2^3 \times T_2 / L_1^3$ (2) The rigidity of the second flexible part 150 when it is rotated on the x-axis is proportional to $T_2^3 \times W_2 / L_1$ According to the above two relationships, the value of (the rigidity of the second flexible part 150 when it is rotated on the y-axis or the rigidity when it is translated in the z-axis direction)/(the rigidity when it is rotated on the x-axis) is proportional to $(W_2/(T_2 L_1))^2$. However, since the second flexible part 150 according to the preferred embodiment has the width $W_2$ in the z-axis direction larger than the thickness $T_2$ in the y-axis direction, $(W_2/(T_2 L_1))^2$ is large, such that the value of (the rigidity of the second flexible part 150 when it is rotated on the y-axis or the rigidity when it is translated in the z-axis direction)/(the rigidity when it is rotated on the x-axis) increases. Due to such characteristics of the second flexible part 150, the first and second mass bodies 110a and 110b are freely rotatable about the x-axis, but are limited from being rotated on the y-axis or translated in the z-axis direction, with respect to the inner frame 120.

Since the first flexible parts 140 have relatively very high rigidity in the length direction (the y-axis direction), the first and second mass bodies 110a and 110b may be limited from being rotated on the z-axis or translated in the y-axis direction, with respect to the internal frame 120.

In addition, since the second flexible part 150 has relatively very high rigidity in the length direction (the x-axis direction), the first mass body 110a and the second mass body 110b may be limited from being translated in the x-axis direction with respect to the internal frame 120.

Due to the characteristics of the first and second flexible parts 140 and 150 described above, the first and second mass bodies 110a and 110b may be allowed to rotate on the x-axis, but be limited from being rotated on the y-axis or z-axis or translated in the z-axis, y-axis, or x-axis direction, with respect to the inner frame 120. Exemplary directions in which the first and second mass bodies 110a and 110b are allowed to rotate may be represented by Table 1 below.

TABLE 1

| Directions in which the first mass body and the second mass body rotate (with respect to the internal frame) | Whether or not movement is allowed |
|---|---|
| Rotation on x-axis | allowed |
| Rotation on y-axis | restricted |
| Rotation on z-axis | restricted |
| Translation in x-axis direction | restricted |
| Translation in y-axis direction | restricted |
| Translation in z-axis direction | restricted |

Since the first mass body 110a and second mass body 110b are allowed to rotate on the x-axis, that is, the second flexible parts 150, but are restricted from being moved in the other directions with respect to the internal frame 120, the first mass body 110a and the second mass body 110b may be displaced by force only in the desired direction (the rotation on the x-axis).

Further, as shown in FIG. 9, the center of gravity C of the first mass body 110a may be located on the same line as the center of rotation R to which the second flexible part 150 is connected in the z-axis direction. However, as shown in FIG. 10, the center of gravity C of the second mass body 110b may be located spaced apart from the center of rotation R to which the second flexible part 150 is connected in the z-axis direction. That is, the first mass body 110a may have the same amount of displacement on either side with respect to the rotation axis since the second flexible part 150 is connected to the center of gravity of the first mass body 110a. In contrast, the second flexible part 150 may be located spaced apart from the center of the second mass body 110b.

That is, the second flexible part 150 may connect the inner frame 120 to an eccentric portion of the second mass body 110b. Accordingly, the second mass body 110b varies in displacement on each side with respect to the rotation axis.

Figure 11A:
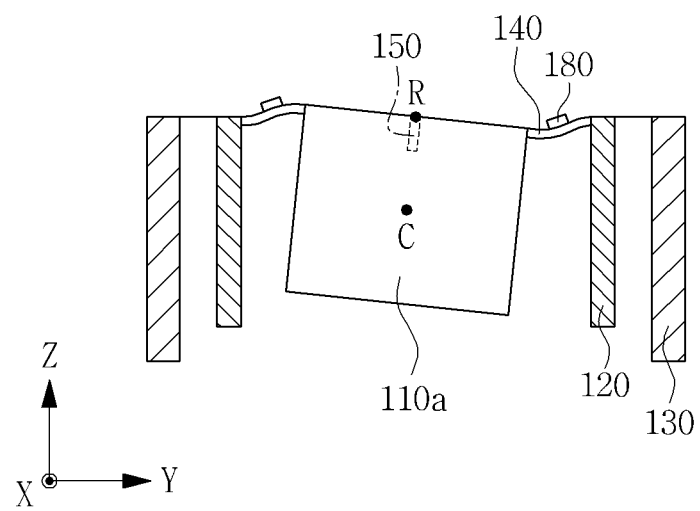
FIGS. 11A and 11B are cross-sectional views showing examples in which the first mass body shown in FIG. 7 is rotated on the second flexible part with respect to the internal frame.
Figure 11B:
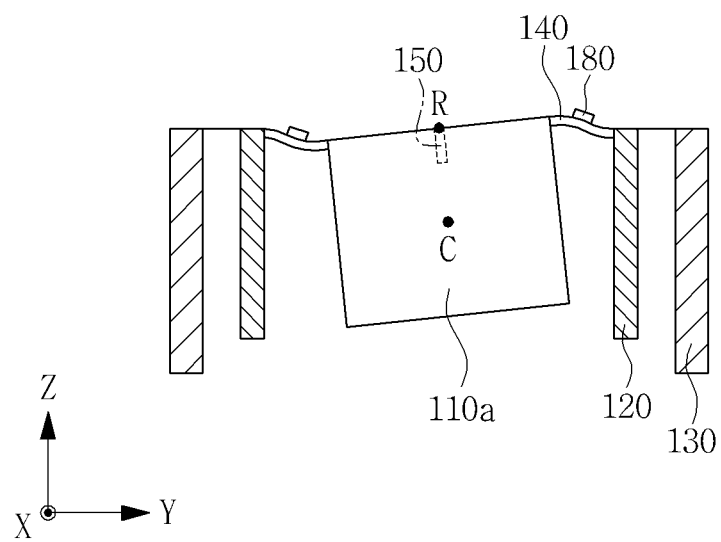

FIGS. 11A and 11B are cross-sectional views showing examples in which the first mass 110a shown in FIG. 7 are rotatable about the second flexible part 150 with respect to the internal frame 120. Since the first mass body 110a is rotated on the x-axis as the rotation axis R with the respect to the internal frame 120, that is, the first mass body 110a is rotated on the axis to which the second flexible part 150 is connected with respect to the internal frame 120, the first flexible part 140 generates bending stress in which the compressive stress and the tensile stress are combined, and the second flexible part 150 generates torsion stress on the x-axis.

In order to generate a torque in the first mass body 110a, the second flexible part 150 may be provided in line with the center of gravity C of the first mass body 110a in the z-axis direction.

As shown in FIG. 3, in order to allow the first mass body 110a to be accurately rotated on the x-axis, the second flexible part 150 may be disposed at a position corresponding to the center of gravity C of the first mass body 110a in the x-axis direction.

The bending stress of the first flexible part 140 may be detected by a sensing unit 180.

Figure 12A:
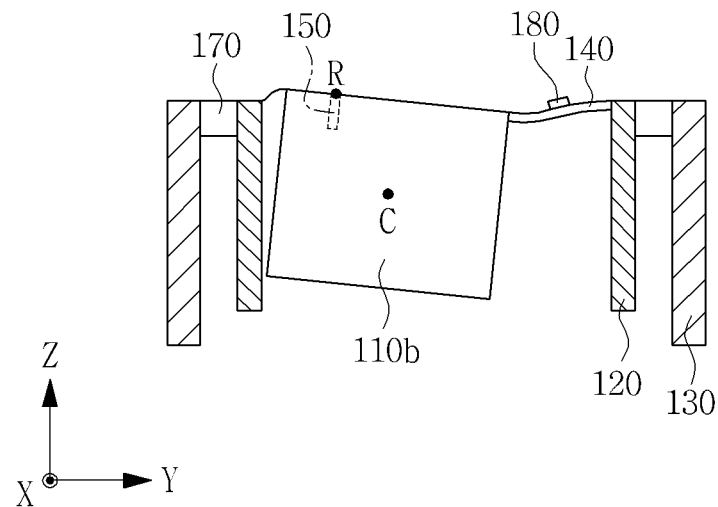
FIGS. 12A and 12B are cross-sectional views showing examples in which the second mass body shown in FIG. 6 is rotated on the second flexible part with respect to the internal frame.
Figure 12B:
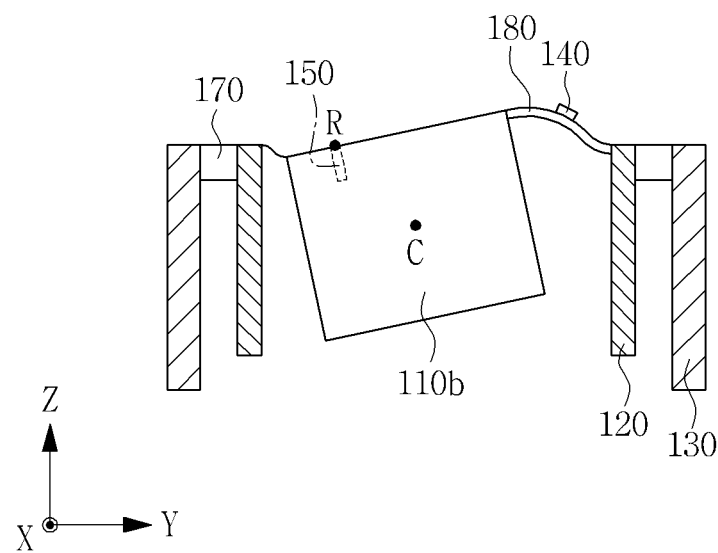

FIGS. 12A and 12B are cross-sectional views showing examples in which the second mass body 110b shown in FIG. 6 is rotated on the second flexible part 150 with respect to the internal frame 120.

The second flexible part 140 may be connected to only one end of the second mass body 110b in the y-axis direction. Since the second mass body 110b is rotated on the x-axis as the rotation axis R with the respect to the internal frame 120, that is, the second mass body 110b is rotated on the axis to which the second flexible part is connected with respect to the internal frame 120, the first flexible part 140 generates bending stress in which the compressive stress and the tensile stress are combined, and the second flexible part 150 generates torsion stress in the x-axis direction.

As the rotation axis R is spaced apart from the center of gravity C of the second mass body 110b to one side, the second mass body 110b has different displacement on either side with respect to the rotation axis R.

The bending stressing of the first flexible part 140 is detected by the sensing unit 180.

Next, exemplary directions in which the internal frame 120 is allowed to move in the angular velocity sensor 100 according to the first preferred embodiment of the present invention will be described in detail with reference to FIGS. 13 and 14.

Figure 13:
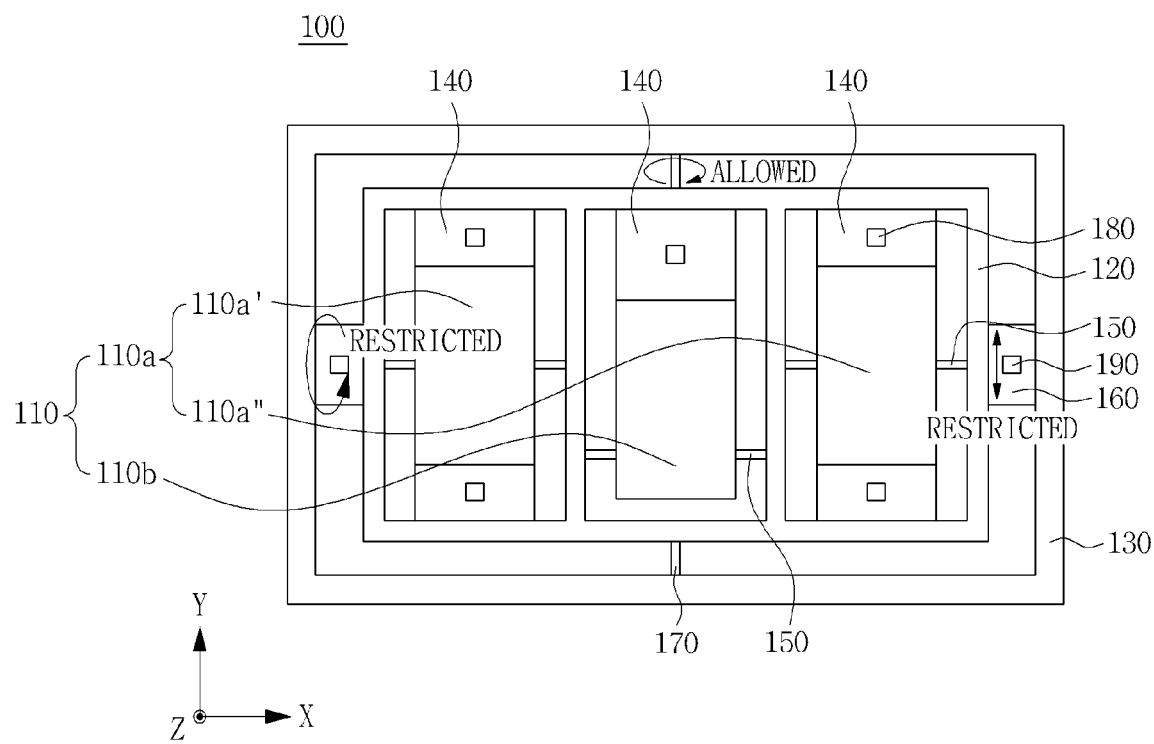
FIG. 13 is a plan view showing directions in which the internal frame is allowed to move in the angular velocity sensor shown in FIG. 3.
Figure 14:
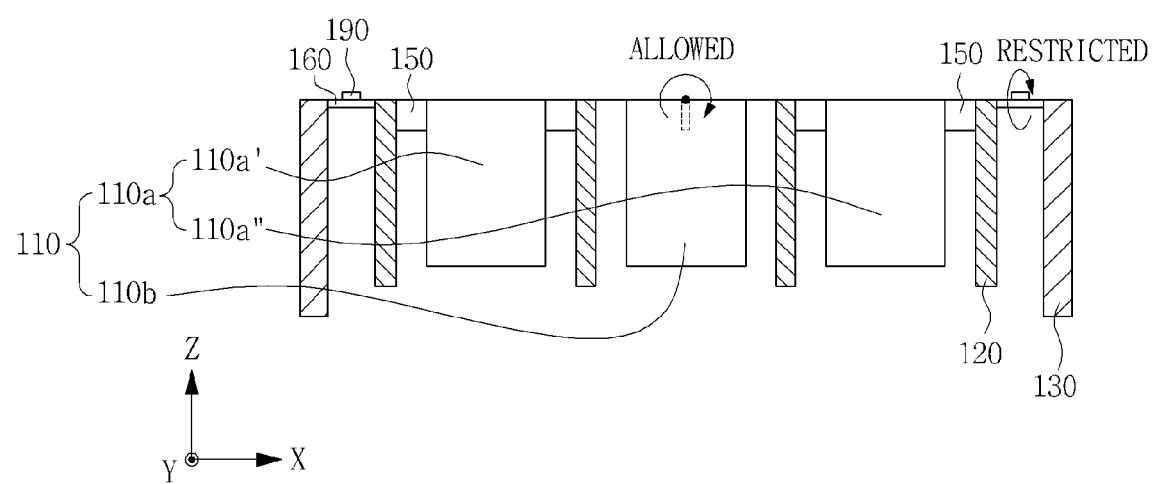
FIG. 14 is a cross-sectional view showing directions in which the internal frame is allowed to move in the angular velocity sensor shown in FIG. 4.

FIG. 13 is a plan view showing exemplary directions in which the internal frame 120 is allowed to move in the angular velocity sensor 100 shown in FIG. 3, and FIG. 14 is a cross-sectional view showing exemplary directions in which the internal frame 120 is allowed to move in the angular velocity sensor 100 shown in FIG. 4.

Since the fourth flexible part 170 has a width $W_4$ in the z-axis direction larger than a thickness $T_4$ in the x-axis direction, the inner frame 120 is restricted from being rotated on the x-axis or translated in the z-axis direction. However, the inner frame 120 may be relatively freely rotated on the y-axis with respect to the external frame 130.

As the rigidity of the fourth flexible part 170 when it is rotated on the x-axis is larger than the rigidity when it is rotated on the y-axis, the inner frame 120 may be more freely rotated on the y-axis but be restricted from being rotated on the x-axis. Similarly, as the rigidity of the fourth flexible part 170 when it is translated in the z-axis direction is larger than the rigidity when it is rotated on the y-axis, the internal frame 120 is allowed to be more freely rotated on the y-axis but is restricted from being translated in the z-axis direction.

Therefore, as a value of (the rigidity of the fourth flexible part 170 when it is rotated on the x-axis or the rigidity when it is translated in the z-axis direction)/(the rigidity when it is rotated on the y-axis) increases, the internal frame 120 is allowed to be more freely rotated on the y-axis but is restricted from being rotated on the x-axis or translated in the z-axis direction, with respect to the external frame 130.

As shown in FIGS. 2 and 5, relationships among the width $W_4$ of the fourth flexible part 170 in the z-axis direction, the length $L_2$ of the fourth flexible part 170 in the y-axis direction, the thickness T4 of the fourth flexible part 170 in the x-axis direction, and the rigidities of the fourth flexible part 170 in each of the directions may be represented as follows.

(1) The rigidity of the fourth flexible part 170 when it is rotated on the x-axis or the rigidity when it is translated in the z-axis direction is proportional to $T_4 \times W_4^3 / L_2^3$ (2) The rigidity of the fourth flexible part 170 when it is rotated on the y-axis is proportional to $T_4^3 \times W_4/L_2$ According to the above two relationships, the value of (the rigidity of the fourth flexible part 170 when it is rotated on the x-axis or the rigidity when it is translated in the z-axis direction)/(the rigidity when it is rotated on the y-axis) is proportional to $(W_4/(T_4 L_2))^2$.

However, since the fourth flexible part 170 has a width $W_4$ in the z-axis direction larger than the thickness $T4$ in the x-axis direction, $(W_4/(T_4 L_2))^2$ is large, such that the value of (the rigidity of the fourth flexible part 170 when it is rotated on the x-axis or the rigidity when it is translated in the z-axis direction)/(the rigidity when it is rotated on the y-axis) increases. Due to above-mentioned characteristics of the fourth flexible parts 170, the internal frame 120 is rotatable on the y-axis but is restricted from being rotated on the x-axis or translated in the z-axis direction with respect to the external frame 130.

The third flexible part 160 has relatively very high rigidity in the length direction (the x-axis direction), the internal frame 120 is restricted from being rotated on the z-axis or translated in the y-axis direction with respect to the external frame 130. In addition, the fourth flexible part 170 has relatively very high rigidity in the length direction (the y-axis direction), the internal frame 120 is restricted from being translated in the y-axis direction with respect to the external frame 130 (See FIG. 8).

Due to the characteristics of the third and fourth flexible parts 160 and 170 described above, the internal frame 120 is allowed to rotate on the y-axis but is restricted from being rotated on the x-axis or z-axis or translated in the z-axis, y-axis, or x-axis direction, with respect to the second frame 130. Exemplary directions in which the internal frame 120 is allowed to move is represented by Table 2 below.

TABLE 2

| Directions in which the internal frame moves (with reference to the external frame) | Whether or not movement is allowed |
| --- | --- |
| Rotation on x-axis | restricted |
| Rotation on y-axis | allowed |
| Rotation on z-axis | restricted |
| Translation in x-axis direction | restricted |
| Translation in y-axis direction | restricted |
| Translation in z-axis direction | restricted |

As such, since the internal frame 120 is allowed to rotate on the y-axis but is restricted from being moved in the other directions with respect to the external frame 130, the internal frame 120 may be allowed to be displaced by force only in the desired direction (e.g., the rotation on the y-axis).

Figure 15A:
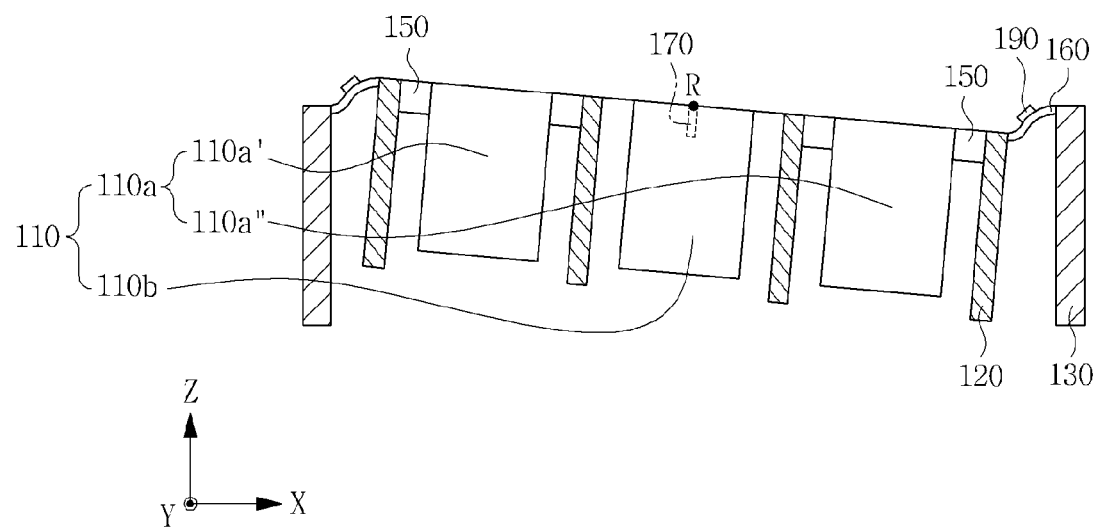
FIGS. 15A and 15B are cross-sectional views showing examples in which the internal frame shown in FIG. 5 is rotated on a fourth flexible part with respect to an external frame.
Figure 15B:
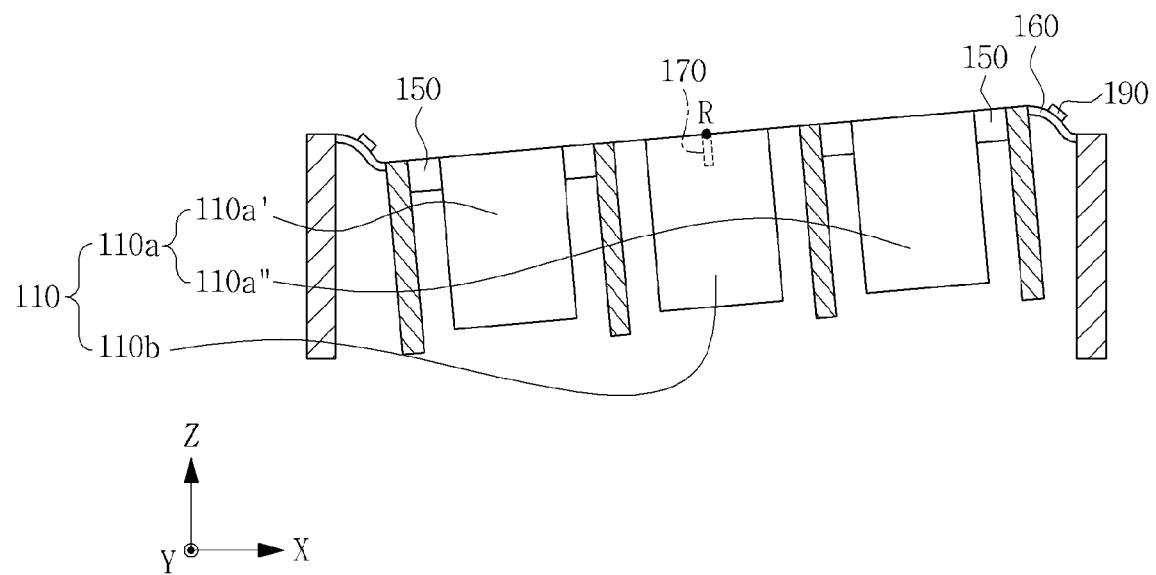

FIGS. 15A and 15B are cross-sectional views showing examples in which the internal frame 120 shown in FIG. 5 is rotated on the fourth flexible part 170 with respect to the external frame 130.

The internal frame 120 is rotatable on the y-axis with respect to the external frame 130. The internal frame 120 may be rotated based on the fourth flexible part 170 hinge-coupling the internal frame 120 with the external frame 130, such that the third flexible part 160 generates bending stress in which the compressive stress and the tensile stress are combined, and the fourth flexible part 170 generates torsion stress in the y-axis direction.

Thus far, the angular velocity sensor 100 according to the first preferred embodiment of the present invention has been described. Now, an exemplary method of measuring an angular velocity using the angular velocity sensor 100 will be described in detail.

First, the internal frame 120 is rotatable on the y-axis with respect to the external frame 130 using the driving unit 190. The first mass bodies 110a' and 110a" and the second mass body 110b may be vibrated while being rotated on the y-axis together with the internal frame 120, and the first mass bodies 110a' and 110a" and the second mass body 110b may be displaced due to the vibration.

For example, displacement (+x, −z) in a +x-axis direction and a −z-axis direction is generated in the first one-side mass body 110a' and at the same time, displacement (+x, +z) in the +x-axis direction and a +z-axis direction is generated in the first other-side mass body 110a". Then, displacement (−x, +z) in a −x-axis direction and the +z-axis direction is generated in the first one-side mass body 110a' and at the same time, displacement (−x, −z) in the −x-axis direction and the −z-axis direction is generated in the first other-side mass body 110a". When the first one-side mass body 110a' and the first other-side mass body 110a" have angular velocity of rotation on the x-axis or z-axis, the Coriolis force is generated.

By the Coriolis force, the first one-side mass body 110a' and the first other-side mass body 110a" are displaced as they rotate on the x-axis with respect to the internal frame 120. The sensing unit 180 detects the displacement by the first one-side mass body 110a' and the first other-side mass body 110a".

When the first one-side mass body 110a' and the first other-side mass body 110a" have angular velocity of rotation on the x-axis, the Coriolis force is generated in the −y-axis direction and then generated in a +y-axis direction in the first one-side mass body 110a', and the Coriolis force is generated in the +y-axis direction and then generated in the −y-axis direction in the first other-side mass body 110a".

Therefore, the first one-side mass body 110a' and the first other-side mass body 110a" are rotated on the x-axis in directions opposite to each other, the sensing unit 180 may sense the displacement of the first one-side mass body 110a' and the first other-side mass body 110a" to calculate the Coriolis force, and angular velocity of rotation on the x-axis may be measured through the Coriolis force.

Further, when signals generated in the first flexible parts 140 and in the sensing unit 180 each connected to one of the ends of the first one-side mass body 110a' are referred to as SY1 and SY2, respectively, and when signals generated in the first flexible parts 140 and in the sensing unit 180 each connected to one of the ends of the first other-side mass body 110a' are referred to as SY3 and SY4, respectively, angular velocity of rotation on the x-axis may be calculated from (SY1-SY2)−(SY3-SY4). As described above, since the signals are differentially output between the first one-side mass body 110a' and the first other-side mass body 110a" rotated in the directions opposite to each other, acceleration noise may be offset.

For instance, when the first one-side mass body 110a' and the first other-side mass body 110a" have angular velocity of rotation on the z-axis, the Coriolis force is generated in the −y-axis direction and then generated in a +y-axis direction in the first one-side mass body 110a', and the Coriolis force is generated in the −y-axis direction and then generated in the +y-axis direction in the first other-side mass body 110a". Therefore, the first one-side mass body 110a' and the first other-side mass body 110a" are rotated on the x-axis in the same direction, the sensing unit 180 may sense the displacement of the first one-side mass body 110a' and the first other-side mass body 110a" to calculate the Coriolis force, and angular velocity of rotation on the z-axis may be measured through the Coriolis force.

When signals generated by the sensing units 180 in the first flexible parts 140 connected to each end of the first one-side mass body 110a' are referred to as SY1 and SY2, respectively, and when signals generated by the sensing unit 180 in the first flexible parts 140 connected to each end of the first other-side mass body 110a" are referred to as SY3 and SY4, respectively, angular velocity rotated on the z-axis may be calculated from (SY1-SY2)+(SY3-SY4).

An example of calculating an angular velocity is as follows.

As described above, when the internal frame 120 is rotated on the y-axis with respect to the external frame 130 by the driving unit 190, the first mass body 110a vibrates while being rotated on the y-axis together with the internal frame 120 and has a velocity Vx in the x-axis and a velocity Vz in the z-axis in response to the vibration. At this time, the first mass body 110a has angular velocities $\Omega_Z$ and $\Omega_X$ on z-axis and x-axis, and the Coriolis force $F_y$ is generated in the y-axis direction.

Due to the Coriolis force F, the first mass body 110a is displaced as it is rotated on the x-axis with respect to the internal frame 120, and the sensing unit 180 senses the displacement of the first mass body 110a. By sensing the displacement of the first mass body 110a, the Coriolis force $F_y$ may be calculated.

Accordingly, the angular velocity $\Omega_X$ on the x-axis may be calculated through the Coriolis force $F_y$ from the equation $F_y=2mVz\Omega_X$, and the angular velocity $\Omega_Z$ on the z-axis may be calculated through the Coriolis force $F_y$ from the equation $F_y=2mVx\Omega_Z$.

As a result, the angular velocity sensor 100 according to the first preferred embodiment may measure the angular velocity rotated on the x-axis or z-axis through the first mass body 110a and the sensing unit 180.

Then, the angular velocity of the second mass body 110b is detected as follows.

First, the internal frame 120 is rotated on the y-axis with respect to the external frame 130 using the driving unit 190.

Like the first mass body 110a, the second mass body 110b vibrates while being rotated on the y-axis together with the internal frame 120, and may be rotated only on the x-axis with the internal frame 120 due to the characteristics of the first flexible part 140 and the second flexible part 150 described above in response to the vibration.

Even though the internal frame 120 is rotated on the y-axis with respect to the external frame 130 using the driving unit 190, the second mass body 110b is not rotated on the y-axis with respect to the internal frame 120.

Due to the characteristics of the third and fourth flexible parts 160 and 170 described above, the internal frame 120 is allowed to rotate only on the y-axis with respect to the external frame 130. Therefore, as shown in FIG. 13, when the displacement of the second mass body 110b is sensed using the first sensing unit 180, even though the Coriolis force in the y-axis direction acts, the internal frame 120 is not rotated on the x-axis with respect to the external frame 130, and the second mass body 110b is rotated on the x-axis only with respect to the internal frame 120.

The second flexible part 150 may be connected to the second mass body 110b eccentrically with respect to the center of gravity C of the second mass body 110b. The first flexible part 140 with the sensing unit 180 may be connected only to one end in the y-axis direction, and the second flexible part 150 serving as a hinge of the rotation may be connected to other ends in the y-axis direction, such that the second mass body 110b is rotated on the x-axis with respect to the internal frame 120, as described above.

When the internal frame 120 is rotated on the y-axis with respect to the external frame 130 by the driving unit 190, the second mass body 110b vibrates while being rotated on the y-axis together with the internal frame 120 and has a velocity $V_x$ in the x-axis in response to the vibration. When the second mass body 110b has angular velocities $\Omega_y$ and $\Omega_z$ on the y-axis and z-axis, the Coriolis forces $F_z$ and $F_y$ generate in the z-axis and y-axis, where the Coriolis forces generate displacement by which the second mass body 110b is rotated on the x-axis with the respect to the internal frame 120.

The sensing unit 180 may sense displacement of the second mass body 110b to calculate the Coriolis force. Through the Coriolis force, the angular velocity in the y-axis direction $\Omega_y$ and the angular velocity in the +z-axis direction $\Omega_Z$ are detected. The angular velocity in the y-axis direction $\Omega_y$ may be calculated by subtracting the angular velocity in the z-axis direction $\Omega_Z$ measured through the center mass body 110a and the sensing unit 180.

Through the above-mentioned configuration, the angular velocity sensor 100 according to the first preferred embodiment of the present invention is implemented as the angular velocity sensor 100 capable of detecting the angular velocity on three-axes by detecting the angular velocities in the x-axis direction and in the z-axis direction with the first mass body 110a and by detecting the angular velocities in the y-axis direction with the second mass body 110b.

Figure 16:
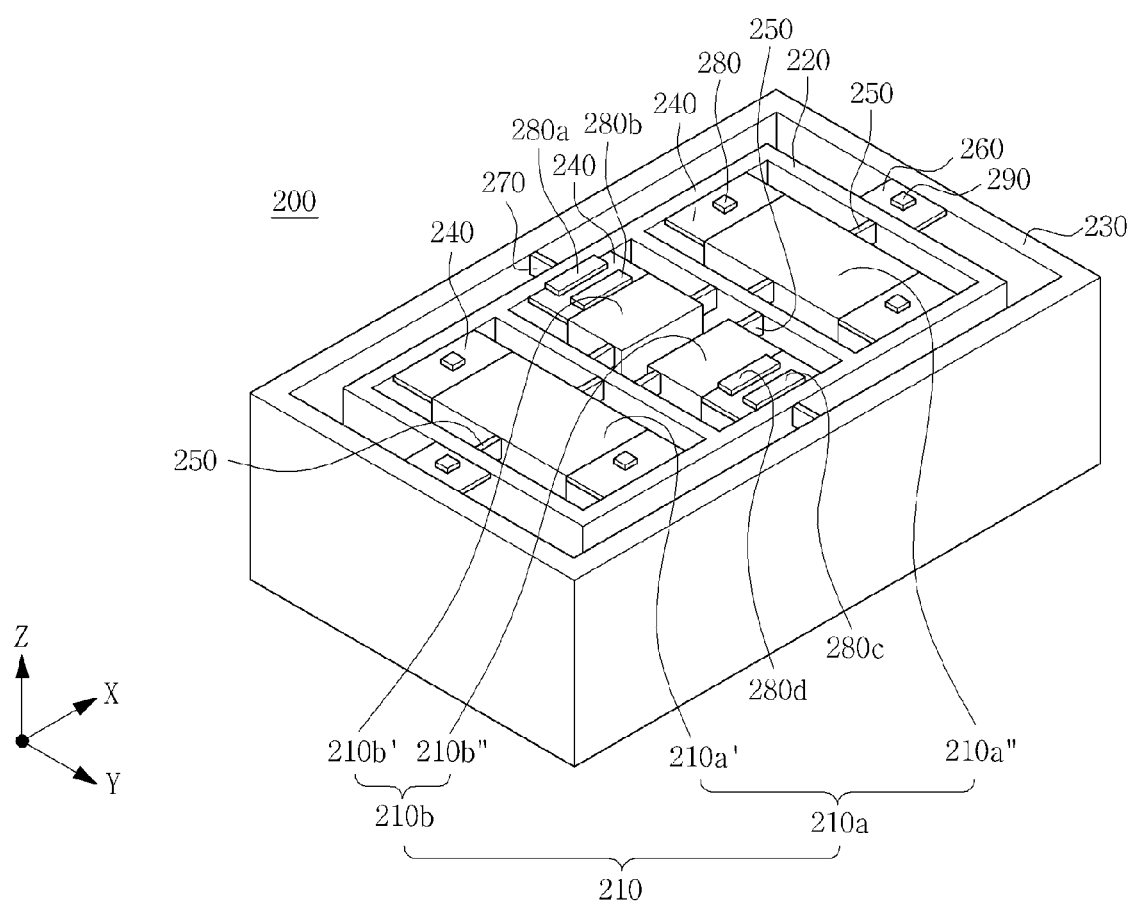
FIG. 16 is a perspective view schematically showing an angular velocity sensor according to a second preferred embodiment of the present invention.
Figure 17:
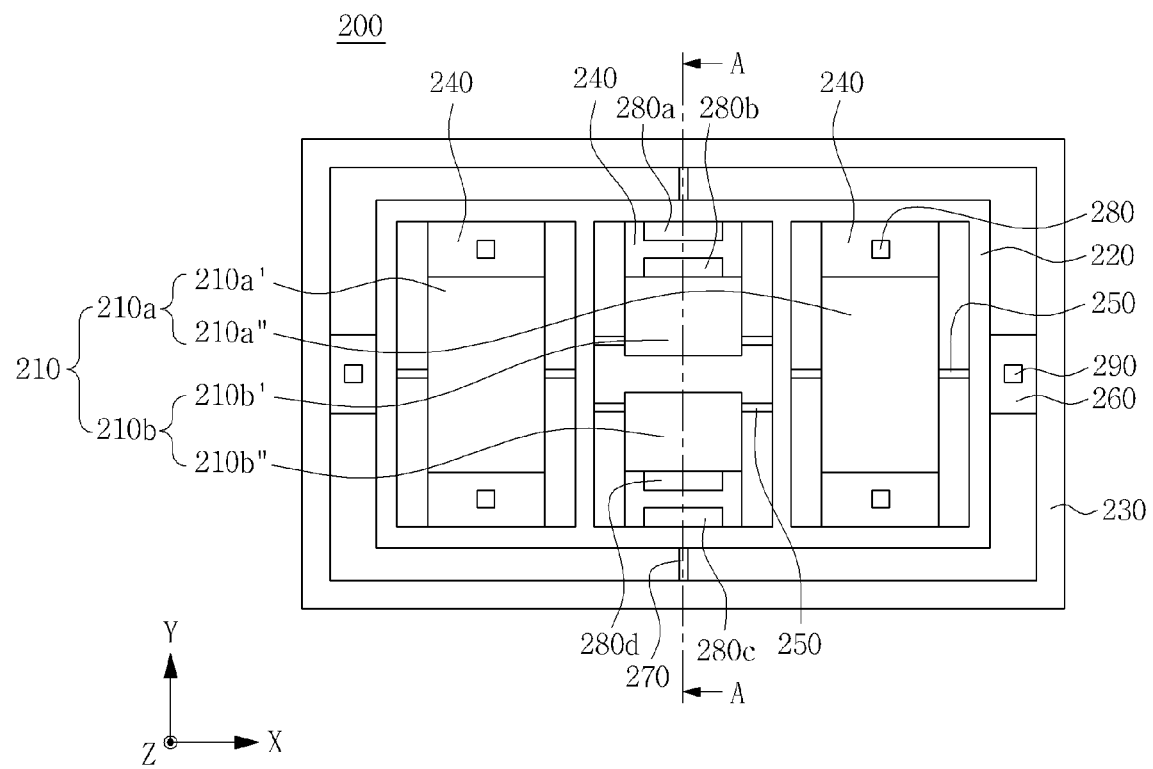
FIG. 17 is a plan view of the angular velocity sensor shown in FIG. 16.
Figure 18:
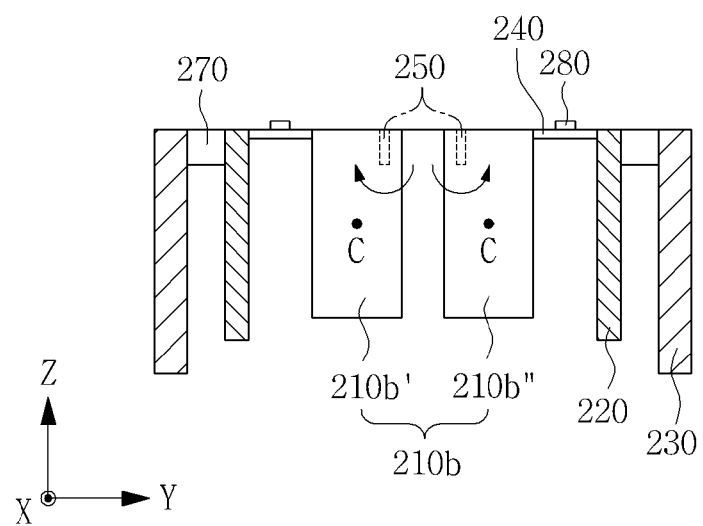
FIG. 18 is a cross-sectional view of the angular velocity sensor shown in FIG. 16 taken along line A-A.

FIG. 16 is a perspective view of an angular velocity sensor 200 according to a second preferred embodiment of the present invention, FIG. 17 is a plan view of the angular velocity sensor 200 shown in FIG. 16, and FIG. 18 is a cross-sectional view of the angular velocity sensor 200 shown in FIG. 16, taken along line A-A.

The angular velocity sensor 200 is identical or similar to the angular velocity sensor 100 of the first preferred embodiment shown in FIG. 2 except for the second mass body.

The angular velocity sensor 200 may include a mass body part 210, an internal frame 220, an external frame 230, a first flexible part 240, a second flexible part 250, a third flexible parts 260, a fourth flexible part 270, a sensing unit 280 and a driving unit 290.

The mass body part 210 may include a first mass body 210a and a second mass body 210b. The first mass body 210a may include a first one-side mass body 210a' and a first other-side mass body 210a" disposed symmetrically with respect to the second mass body 210b.

In addition, the second mass body 210b may include a second one-side mass body 210b' and a second one-side mass body 210b" which are arranged symmetrically. The first flexible part 240 may be connected to only one end in the y-axis of the second mass body 210b, and the second flexible part 250 may be connected to other ends in the x-axis direction such that it is eccentric to the center of gravity C of the second mass body 210b.

The second flexible part 250 connects the internal frame 220 to an eccentric portion of the second mass body 110b.

For example, the second one-side mass body 210b' has the first flexible part 240 connected to one end in the y-axis direction and the first flexible part 240 is connected to the internal frame 220. Further, the second one-side mass body 210b' has one or more second flexible parts 250 connected in the x-axis direction to other ends in the y-axis direction and the second flexible parts 250 are connected to the internal frame 220.

The second other-side mass body 210b" is connected to the internal frame 220 such that the second other-side mass body 210b" and the second one-side mass body 210b' are arranged symmetrically with respect to the x-axis.

For instance, the second other-side mass body 210b" has the first flexible part 240 connected to one end in the y-axis direction and the first flexible part 240 is connected to the internal frame 220. The second other-side mass body 210b" has one or more second flexible parts 250 connected to other ends in the y-axis direction and the second flexible part 250s are connected to the internal frame 220.

At the first flexible part 240 connected to the second mass body 210b, a sensing unit 280 is provided to sense displacement of the second mass body 210b.

The first flexible part 240 may include two or more sensing units 280 in order to improve sensitivity and to cancel noise.

For example, on one surface of the first flexible part 240 connecting the second one-side mass body 210b' to the internal frame 220 in the y-axis direction, a first sensing unit 280a may be located adjacent to the internal frame 220 in the y-axis direction, and a second sensing unit 280b may be located adjacent to the second one-side mass body 210b'.

On one surface of the first flexible part 240 connecting the second other-side mass body 210b" to the internal frame 220 in the y-axis direction, a third sensing unit 280c may be located adjacent to the internal frame 220 in the y-axis direction, and a fourth sensing unit 280d may be formed adjacent to the second other-side mass body 210b".

As mentioned earlier, the other detailed technical configurations, shapes and relationships between elements of the angular velocity sensor according to the second preferred embodiment of the present invention other than the second mass body are identical or similar to those of the first preferred embodiment of the present invention. Therefore, descriptions thereof will be omitted.

An exemplary method of detecting angular velocity according to the second mass body part 210 for the angular velocity sensor according to the second preferred embodiment of the present invention is as follows.

The internal frame 220 is rotated on the y-axis with respect to the external frame 230 using the driving unit 290.

Like the first mass body 210a, the second one-side mass body 210b' and the second other-side mass body 210b" vibrate while being rotated on the y-axis together with the internal frame 220, and are allowed to rotate only on the x-axis with respect to the internal frame 220 due to the characteristics of the first flexible part 240 and the second flexible part 250 described above in response to the vibration.

Even though the internal frame 220 is rotated on the y-axis with respect to the external frame 230 using the driving unit 290, the second one-side mass body 210b and the second other-side mass body 210b" are not rotated on the y-axis with respect to the internal frame 220.

As indicated by the arrows in FIG. 18, the second one-side mass body 210b' and the second other-side mass body 210b" are rotated symmetrically with respect to the second flexible part 250.

Due to the characteristics of the third flexible part 260 and the fourth flexible part 270 described above, the internal frame 220 is allowed to rotate only on the y-axis with respect to the external frame 230. When displacement of the second one-side mass body 210b' and the second other-side mass body 210b" is detected using the first to fourth sensing units 280a, 280b, 280c and 280d, even though the Coriolis force works in the y-axis direction, the internal frame 220 is not rotated on the x-axis with respect to the external frame 230, and only the second one-side mass body 210b' and the second other-side mass body 210b" are rotated on the x-axis symmetrically with respect to the internal frame 120.

The second one-side mass body 210b' and the second other-side mass body 210b" are rotated on the x-axis with respect to the internal frame 220, and the first and second sensing units 280a and 280b detect displacement of the second one-side mass body 210b' and the third and the fourth sensing units 280c and 280d detect displacement of the second other-side mass body 210b" to calculate the Coriolis force.

When the internal frame 220 is rotated on the y-axis with respect to the external frame 230 by the driving unit 290, the second mass body 210b vibrates while being rotated on the y-axis together with the internal frame 220 and generates a velocity $V_x$ in the x-axis in response to the vibration. When the second mass body 210b has angular velocities $\Omega_Y$ on the y-axis and $\Omega_z$ on z-axis, the Coriolis forces $F_z$ and $F_y$ are generated in the z-axis and y-axis, where the Coriolis forces generate displacement by which the second mass body 210b is rotated on the x-axis with the respect to the internal frame 220. The Coriolis force in the z-axis direction generates the displacement in opposite directions to each other with respect to the second one-side mass body 210b' and the second other-side mass body 210b". The Coriolis force in the y-axis direction generates the displacement in the same direction with respect to the second one-side mass body 210b' and the second other-side mass body 210b".

Through the Coriolis force, the angular velocity in the y-axis direction $\Omega_y$ and the angular velocity in the z-axis direction $\Omega_Z$ are detected. The angular velocity in the y-axis direction $\Omega_y$ may be calculated by subtracting the angular velocity in the z-axis direction $\Omega_Z$.

The angular velocity in the x-axis direction $\Omega_X$ and the angular velocity in the z-axis direction $\Omega_z$ of the first mass body 210a are detected in the same manner as the first mass body 110a described above in the first preferred embodiment.

Through the above-mentioned configuration, the angular velocity sensor 200 according to the second preferred embodiment of the present invention is implemented as the angular velocity sensor 200 capable of detecting the angular velocity on three-axes by detecting the angular velocities in the x-axis direction and in the z-axis direction with the first mass body 210a and by detecting the angular velocities in the y-axis direction and in the z-axis direction with the two symmetric second mass bodies 210b' and 210b", in the same method as the angular velocity sensor 100 according to the first preferred embodiment described above.

Figure 19:
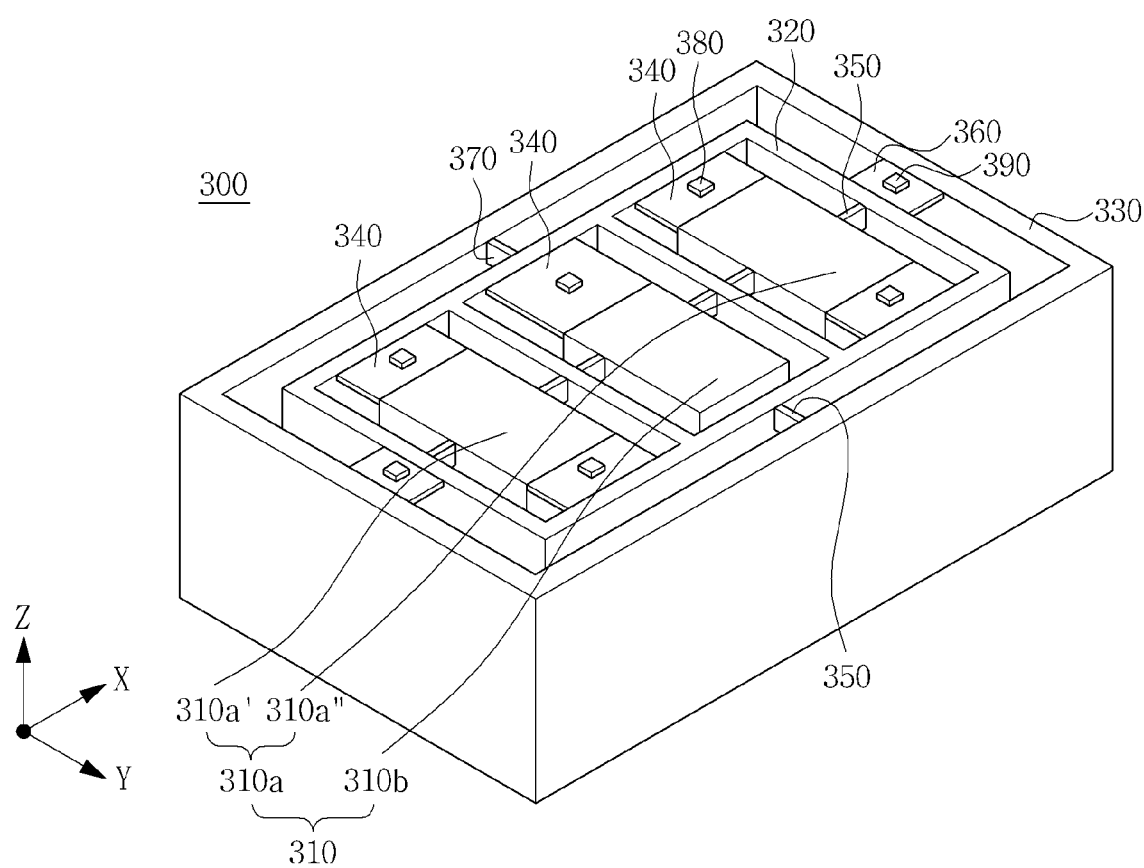
FIG. 19 is a perspective view schematically showing an angular velocity sensor according to a third preferred embodiment of the present invention.
Figure 20:
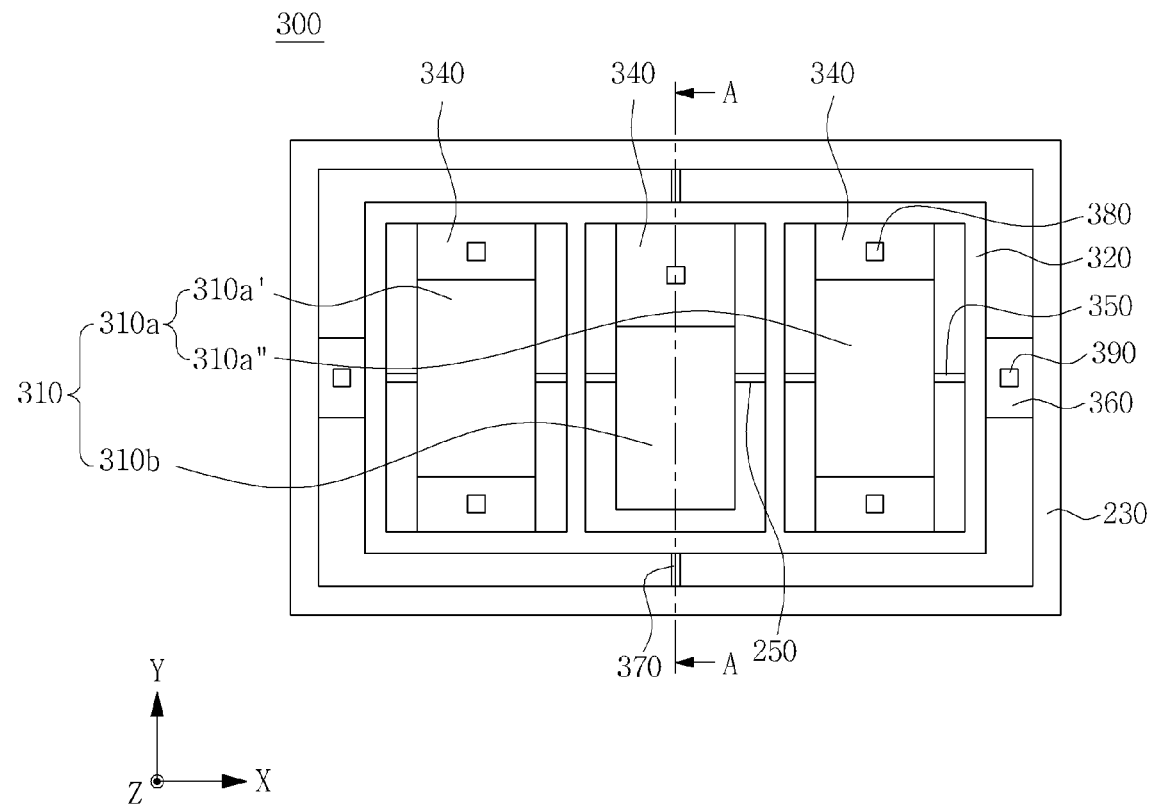
FIG. 20 is a plan view of the angular velocity sensor shown in FIG. 19.
Figure 21:
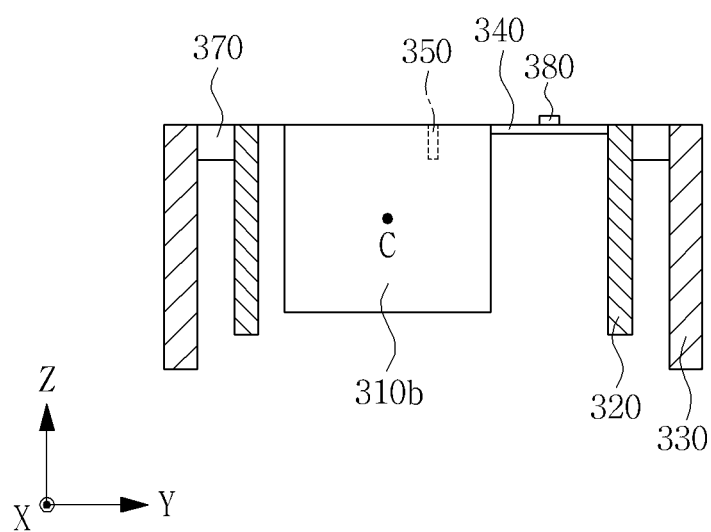
FIG. 21 is a cross-sectional view of the angular velocity sensor shown in FIG. 19 taken along line A-A.

FIG. 19 is a perspective view of an angular velocity sensor according to a third preferred embodiment of the present invention, FIG. 20 is a plan view of the angular velocity sensor shown in FIG. 19, and FIG. 21 is a cross-sectional view of the angular velocity sensor shown in FIG. 19, taken along line A-A.

The angular velocity sensor 300 is identical or similar to the angular velocity sensor 100 sensor according to the first preferred embodiment of the present invention shown in FIG. 2 except for the second mass body.

The angular velocity sensor 300 may include a mass body part 310, an internal frame 320, an external frame 330, a first flexible part 340, a second flexible part 350, a third flexible part 360, a fourth flexible part 370, a sensing unit 380 and a driving unit 390.

The mass body part 310 may include a first mass body 310a and a second mass body 310b. The first mass body 310a may include a first one-side mass body 310a' and a first other-side mass body 310a" disposed symmetrically with respect to the second mass body 310b.

The first flexible part 340 may be connected to only one end of the second mass body 310b in the y-axis direction. One or more the second flexible parts 350 are connected in the x-axis direction to the second mass body 310b such that the second flexible part 350 is spaced apart from the center of gravity of the second mass body 310b in the y-axis direction.

The second flexible part 350 connects the internal frame 320 to an eccentric portion of the second mass body 310b.

The first flexible part 340 and the second flexible part 350 may be connected only to one end of the second mass body 310b, and the other end of the second mass body 310b may be formed as a free end.

The second flexible part 350 connects the second mass body 310b to the internal frame 320 in the x-axis direction in line with the center of the internal frame 320 in the y-direction.

One end of the second mass body 310b in the y-axis direction is connected to the internal frame 320 by the first flexible part 340, and sides of the second mass body 310b may be connected to the internal frame 320 by the second flexible part 350 such that it is eccentric to the center of gravity of the second mass body 310b in the y-axis direction. The second flexible part 350 connecting the first mass body 310a and the second mass body 310b to the internal frame 320 may be on the same extended line. The first flexible part 340 connected to the second mass body 310b is wider than the first flexible part 340 connected to the first mass body 310a.

As mentioned earlier, the other detailed technical configurations, shapes and relationships between elements of the angular velocity sensor according to the third preferred embodiment of the present invention than the second mass body are identical or similar to those of the first preferred embodiment of the present invention. Therefore, descriptions thereof will be omitted.

An exemplary method of detecting angular velocity according to the second mass body for the angular velocity sensor according to the third preferred embodiment of the present invention is as follows.

The internal frame 320 is rotated on the y-axis with respect to the external frame 330 using the driving unit 390.

Like the first mass body 310a, the second mass body 310b vibrates while being rotated on the y-axis together with the internal frame 320, and may be rotated only on the x-axis with the internal frame 320 due to the characteristics of the first flexible part 340 and the second flexible part 350 described above in response to the vibration.

Even though the internal frame 320 is rotated on the y-axis with respect to the external frame 330 using the driving unit 390, the second mass body 310b cannot be rotated on the y-axis with respect to the internal frame 320.

Due to the characteristics of the third and fourth flexible parts 360 and 370 described above, the internal frame 320 can rotate only on the y-axis with respect to the external frame 330.

When the sensing unit 380 provided on the first flexible part 340 senses the displacement of the second mass body 310b, even though the Coriolis force in the y-axis direction acts, the internal frame 320 is not rotated on the x-axis with respect to the external frame 150, and only the second mass body 310b is rotated on the x-axis with respect to the internal frame 320.

The second flexible part 350 is connected to the second mass body 310b such that it is eccentric to the center of gravity C of the second mass body 310b, the first flexible part 340 and the second flexible part 350 with the sensing units 380 are connected only to one end in the y-axis direction, and the other end in the y-axis is formed as a free end. Accordingly, as described above, the second mass body 310b is rotatable on the x-axis with respect to the internal frame 320 and the sensing unit 380 formed on the first flexible part 340 detects the displacement of the second mass body 310b, to calculate the Coriolis force. Through the Coriolis force, the angular velocity in the y-axis direction $\Omega_y$ and the angular velocity in the z-axis direction $\Omega_Z$ are detected. The angular velocity in the y-axis direction $\Omega_y$ may be calculated by subtracting the angular velocity in the z-axis direction $\Omega_Z$ measured through the first mass body 310a and the sensing unit 380.

The angular velocity sensor 300 according to the third preferred embodiment of the present invention is implemented as the angular velocity sensor capable of detecting the angular velocity on three-axes by detecting the angular velocities in the x-axis direction $\Omega_X$ and in the z-axis direction $\Omega_Z$ with the first mass body 310a and by detecting the angular velocities in the y-axis direction $\Omega_Y$ with the second mass body 310b.

Figure 22:
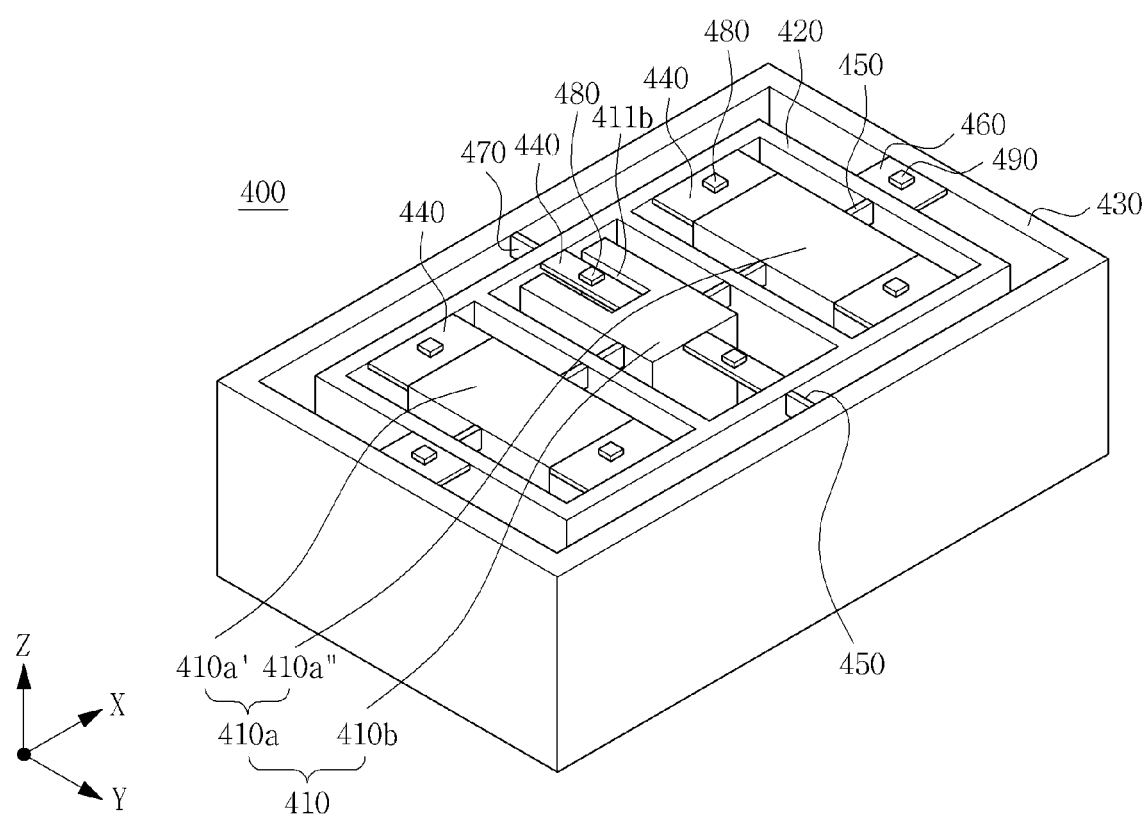
FIG. 22 is a perspective view schematically showing an angular velocity sensor according to a fourth preferred embodiment of the present invention.
Figure 23:
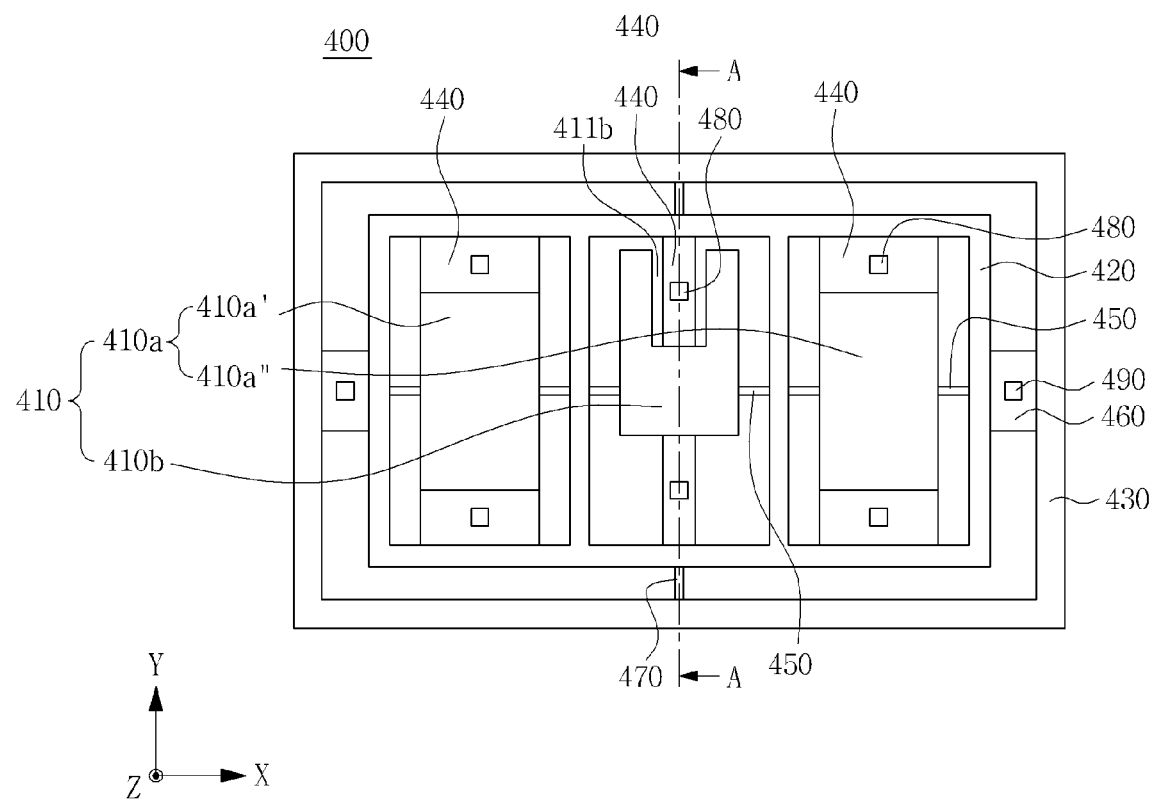
FIG. 23 is a plan view of the angular velocity sensor shown in FIG. 22.
Figure 24:
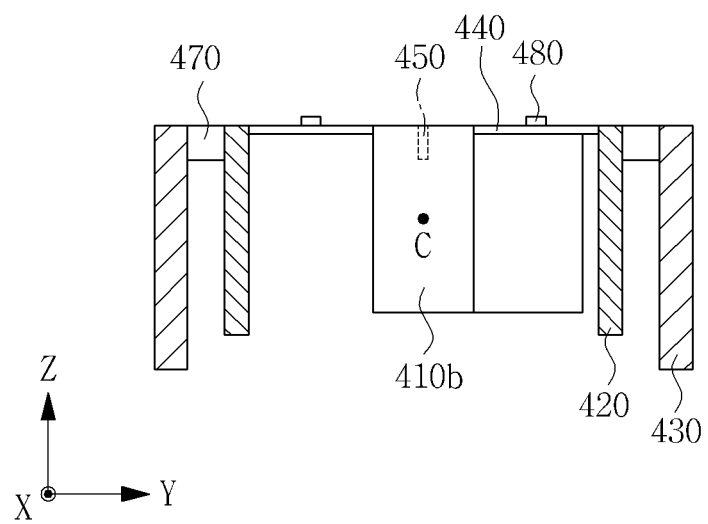
FIG. 24 is a cross-sectional view schematically showing the angular velocity sensor shown in FIG. 22 taken along line A-A.

FIG. 22 is a perspective view of an angular velocity sensor 400 according to a fourth preferred embodiment of the present invention, FIG. 23 is a plan view of the angular velocity sensor 400 shown in FIG. 22, and FIG. 24 is a cross-sectional view of the angular velocity sensor 400 shown in FIG. 22, taken along line A-A.

The angular velocity sensor 400 is identical or similar to the angular velocity sensor 100 sensor according to the first preferred embodiment of the present invention shown in FIG. 2 except for the second mass body.

The angular velocity sensor 400 may include a mass body part 410, an internal frame 420, an external frame 430, a first flexible part 440, a second flexible part 450, a third flexible parts 460, a fourth flexible part 470, a sensing unit 480 and a driving unit 490.

The mass body 410 may include a first mass body 410a and a second mass body 410b.

The first mass body 410a may include a first one-side mass body 410a' and a first other-side mass body 410a" disposed symmetrically with respect to the second mass body 410b.

The second mass body 410b may have a hollow part 411b therein. The hollow part 411b is formed at one end in the y-axis direction such that the second mass body 410b may have a U-shape. The first flexible part 440 may be connected to both ends of the second mass body 410b in the y-axis direction.

One or more second flexible parts 450 are connected to the second mass body 410b in the x-axis direction.

The second mass body 410b may have one or more first flexible parts 440 connected to the both ends in the y-axis direction, and the first flexible parts 400 are connected to the internal frame 420. Accordingly, the second mass body 410b may have the second flexible part 450 connected to the both sides in the x-axis direction such that it is spaced apart from the center of gravity C in the y-axis direction, and the second flexible part 450 is connected to the internal frame 420.

The second flexible part 450 connects the internal frame 420 to an eccentric portion of the second mass body 410b.

A sensing unit 480 sensing displacement of the second mass body 410b is provided on the surface of the first flexible parts 440.

As mentioned earlier, the other detailed technical configurations, shapes and relationships between elements of the angular velocity sensor according to the fourth preferred embodiment of the present invention other than the second mass body are identical or similar to those of the first preferred embodiment of the present invention. Therefore, descriptions thereof will be omitted.

Then, a method of detecting angular velocity according to the second mass body for the angular velocity sensor according to the fourth preferred embodiment of the present invention is as follows.

The internal frame 420 is rotated on the y-axis with respect to the external frame 430 using the driving unit 490.

Like the first mass body 410a, the second mass body 410b vibrates while being rotated on the y-axis together with the internal frame 420, and may be rotated only on the x-axis with the internal frame 420 due to the characteristics of the first flexible part 440 and the second flexible part 450 described above in response to the vibration.

Even though the internal frame 420 is rotated on the y-axis with respect to the external frame 430 using the driving unit 490, the second mass body 410b cannot be rotated on the y-axis with respect to the internal frame 420.

As described above in relation to the third and fourth flexible parts of the angular velocity sensor according to the first preferred embodiment, due to the characteristics of the third and fourth flexible parts 460 and 470, the internal frame 420 may rotate only on the y-axis with respect to the external frame 430.

When the sensing unit 480 provided on the first flexible part 440 senses the displacement of the second mass body 410b, even though the Coriolis force in the y-axis direction acts, the internal frame 420 cannot be rotated on the x-axis with respect to the external frame 430, and only the second mass body 410b may be rotated on the x-axis with respect to the internal frame 420.

At least one second flexible part 450 is connected to the second mass body 410b such that it is eccentric to the center of gravity C, the first flexible part 440 with the sensing unit 480 may be connected to both ends in the y-axis direction, and the second flexible part 450 serving as a hinge of the rotation may be connected in the x-axis direction. Accordingly, as described above, the second mass body 410b can be rotated on the x-axis with respect to the internal frame 420 and the sensing unit 480 formed on the first flexible part 440 detects the displacement of the second mass body 410b, to calculate the Coriolis force. Through the Coriolis force, the angular velocity in the y-axis direction $\Omega_y$ and the angular velocity in the z-axis direction $\Omega_z$ are detected. The angular velocity in the y-axis direction $\Omega_y$ may be calculated by subtracting the angular velocity in the z-axis direction $\Omega_z$ measured through the first mass body 410a and the sensing unit 480.

Through the above-mentioned configuration, the angular velocity sensor 400 according to the fourth preferred embodiment of the present invention is implemented as the angular velocity sensor capable of detecting the angular velocity on three-axes by detecting the angular velocities in the x-axis direction $\Omega_X$ and in the z-axis direction $\Omega_Z$ with the first mass body 410a and by detecting the angular velocities in the y-axis direction $\Omega_Y$ with the second mass body 410b.

According to some embodiments there is provided a sensing module for a sensor, in which a mass body part may include a first mass body connected in line with the center of gravity and a second mass body connected to be spaced apart from the center of gravity to produce different displacements, such that physical quantity on multiple axes can be sensed simultaneously. According to some embodiments of the present invention, an angular velocity sensor may be integrated with a driving unit capable of removing interference between the driving mode and sensing mode and reducing influence due to manufacturing error in a such manner that a plurality of frames is provided and the frames and mass bodies are driven by one driving unit so that driving displacement and sensing displacement are separately generated to allow the mass bodies to move in a particular direction. According to some embodiments of the present invention, an angular velocity sensor is capable of sensing three-axes angular velocity, the sensor having a mass body inserted in a frame that includes a first mass body connected to correspond to the center of gravity and a second mass body connected to be spaced apart from the center of gravity, where the driving and displacement of the first and second mass bodies according to the driving of the frame is different. According to some embodiments of an angular velocity sensor, driving displacement is increased by the first mass bodies disposed either sides of the second mass body and accordingly to improve sensitivity.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims. Additionally, the illustrative discussions above are not intended to be exhaustive or to limit the invention to the precise forms disclosed.

What is claimed is:

1. A sensing module for a sensor, the sensing module comprising:
   a mass body part comprising a first mass body and a second mass body;
   a frame supporting the first mass body and the second mass body;
   a first flexible part connecting the first mass body to the frame;
   another first flexible part connecting the second mass body to the frame;
   a second flexible part connecting the first mass body to the frame; and
   another second flexible part connecting the second mass body to the frame;
   wherein the second flexible part connects the first mass body to the frame in a first direction along a line passing through a center of gravity of the first mass body when viewed in a second direction perpendicular to the first direction;
   the other second flexible part connects the second mass body to the frame in the first direction along a line not passing through a center of gravity of the second mass body when viewed in the second direction;
   wherein the first flexible part connects the first mass body to the frame in a third direction perpendicular to the first direction and the second direction: and
   the other first flexible part connects the second mass body to the frame in the third direction.

2. The sensing module of claim 1, wherein each of the first flexible parts has a thickness in the second direction, and a width in the first direction that is larger than the thickness of each of the first flexible parts in the second direction.

3. The sensing module of claim 1, wherein each of the second flexible parts has a thickness in a third direction perpendicular to the first direction and the second direction, and a width in the second direction that is larger than the thickness of each of the second flexible parts in the third direction.

4. An angular velocity sensor comprising:
a mass body part comprising a first mass body and a second mass body;
an internal frame supporting the first mass body and the second mass body;
a first flexible part connecting the first mass body to the internal frame;
another first flexible part connecting the second mass body to the internal frame;
a second flexible part connecting the first mass body to the internal frame;
another second flexible part connecting the second mass body to the internal frame;
an external frame supporting the internal frame;
a third flexible part connecting the internal frame to the external frame; and
a fourth flexible part connecting the internal frame to the external frame,
wherein the second flexible part connects the first mass body to the internal frame in a first direction along a line passing through a center of gravity of the first mass body when viewed in a second direction perpendicular to the first direction ;
the other second flexible part connects the second mass body to the internal frame in the first direction along a line not passing through a center of gravity of the second mass body when viewed in the second direction;
wherein the first flexible part connects the first mass body to the internal frame in a third direction perpendicular to the first direction and the second direction; and
the other first flexible part connects the second mass body to the internal frame in the third direction.

5. The angular velocity sensor of claim 4, wherein the fourth flexible part connects the internal frame to the external frame in the third direction along a third line extending through the center of gravity of the second mass body when viewed in the second direction.

6. The angular velocity sensor of claim 4, wherein the third flexible part connects the internal frame to the external frame in the first direction; and
the fourth flexible part connects the internal frame to the external frame in the third direction.

7. The angular velocity sensor of claim 4, wherein the third flexible part connects the internal frame to the external frame in the first direction.

8. The angular velocity sensor of claim 4, wherein the fourth flexible part connects the internal frame to the external frame in the third direction.

9. The angular velocity sensor of claim 4, wherein each of the first flexible parts has a thickness in the second direction, and a width in the first direction that is larger than the thickness of each of the first flexible parts in the second direction.

10. The angular velocity sensor of claim 9, wherein the first flexible part connecting the first mass body to the internal frame connects one end of the first mass body to the internal frame in the third direction; and
the angular velocity sensor further comprises another first flexible part connecting another end of the first mass body to the internal frame in the third direction.

11. The angular velocity sensor of claim 9, wherein the other first flexible part connecting the second mass body to the internal frame connects one end of the second mass body to the internal frame in the third direction; and
the angular velocity sensor further comprises another first flexible part connecting another end of the second mass body to the internal frame in the third direction.

12. The angular velocity sensor of claim 4, wherein each of the second flexible parts has a thickness in the third direction, and a width in the second direction that is larger than the thickness of each of the second flexible parts in the third direction.

13. The angular velocity sensor of claim 12, wherein the line passing through the center of gravity of the second mass body is aligned with the line passing through the center of gravity of the first mass body in the third direction when viewed in the second direction.

14. The angular velocity sensor of claim 12, wherein line passing through the center of gravity of the second mass body is spaced apart from the line passing through the center of gravity of the first mass body in the third direction when viewed in the second direction.

15. The angular velocity sensor of claim 4, wherein the third flexible part has a thickness in the second direction, and a width in the third direction that is larger than the thickness of the third flexible part in the second direction.

16. The angular velocity sensor of claim 4, wherein the fourth flexible part has a thickness in the first direction, and a width in the second direction that is larger than the thickness of the fourth flexible part in the first direction.

17. The angular velocity sensor of claim 4, wherein the fourth flexible part connects the internal frame to the external frame along a rotation axis of the internal frame; and
the angular velocity sensor further comprises a driving unit disposed on the third flexible part and configured to rotate the internal frame about the rotation axis of the internal frame relative to the external frame.

18. The angular velocity sensor of claim 17, wherein rotation of the internal frame about the rotation axis of the internal frame by the driving unit generates a bending stress in the third flexible part and a torsion stress in the fourth flexible part.

19. The angular velocity sensor of claim 18, wherein second flexible part connects the first mass body to the internal frame along a rotation axis of the first mass body;
the other second flexible part connects the second mass body to the internal frame along a rotation axis of the second mass body; and
rotation of the internal frame about the rotation axis of the internal frame by the driving unit rotates the first mass body about the rotation axis of the first mass body relative to the internal frame, and rotates the second mass body about the rotation axis of the second mass body relative to the internal frame.

20. The angular velocity sensor of claim 19, wherein rotation of the first mass body about the rotation axis of the first mass body by the rotation of the internal frame generates a bending stress in the first flexible part connecting the first mass body to the internal frame and a torsion stress in the second flexible part connecting the first mass body to the internal frame; and
rotation of the second mass body about the rotation axis of the second mass body by the rotation of the internal frame generates a bending stress in the other first flexible part connecting the second mass body to the internal frame and a torsion stress in the other second flexible part connecting the second mass body to the internal frame.

21. The angular velocity sensor of claim 4, wherein the first mass body comprises a first one-side mass body and a first other-side mass body disposed on opposite sides of the second mass body so that the line passing through the center of gravity of the first mass body passes through a center of gravity of each of the first one-side mass body and the second one-side mass body when viewed in the second direction.

22. The angular velocity sensor of claim 21, wherein the first flexible part connects one end of the first one-side mass body to the internal frame in the third direction;
the other first flexible part connects one end of the second mass body to the internal frame in the third direction; and
the angular velocity sensor further comprises:
another first flexible part connecting another end of the first one-side mass body to the internal frame in the third direction;
another first flexible part connecting one end of the first other-side mass body to the internal frame in the third direction; and
another first flexible part connecting another end of the first other-side mass body to the internal frame in the third direction.

23. The angular velocity sensor of claim 22, wherein the second flexible part connects one end of the first one-side mass body to the internal frame in the first direction along the line passing through the center of gravity of the first mass body;
the other second flexible part connects one end of the second mass body to the internal frame in the first direction along the line not passing through the center of gravity of the second mass body; and
the angular velocity sensor further comprises:
another second flexible part connecting another end of the first one-side mass body to the internal frame in the first direction along the line passing through the center of gravity of the first mass body;
another second flexible part connecting one end of the first other-side mass body to the internal frame in the first direction along the line passing through the center of gravity of the first mass body;
another second flexible part connecting another end of the first other-side mass body to the internal frame in the first direction along the line passing through the center of gravity of the first mass body; and
another second flexible part connecting another end of the second mass body to the internal frame in the first direction along the line not passing through the center of gravity of the second mass body.

24. The angular velocity sensor of claim 21, wherein the first one-side mass body and the first other-side mass body are disposed symmetrically in the internal frame with respect to a centerline of the internal frame extending in the third direction when viewed in the second direction; and
the fourth flexible part connects the internal frame to the external frame along the centerline of the internal frame.

25. An angular velocity sensor comprising:
a mass body part comprising a first mass body and a second mass body;
an internal frame supporting the first mass body and the second mass body;
a first flexible part connecting the first mass body to the internal frame;
other first flexible parts connecting the second mass body to the internal frame;
a second flexible part connecting the first mass body to the internal frame;
other second flexible parts connecting the second mass body to the internal frame;
an external frame supporting the internal frame;
a third flexible part connecting the internal frame to the external frame; and
a fourth flexible part connecting the internal frame to the external frame;
wherein the second mass body comprises a second one-side mass body and a second other-side mass body disposed symmetrically in the internal frame with respect to a centerline of the internal frame extending in a first direction when viewed in a second direction perpendicular to the first direction;
the second flexible part connects the first mass body to the internal frame in the first direction along a line passing through a center of gravity of the first mass body when viewed in the second direction;
one of the other second flexible parts connects the second one-side mass body to the internal frame in the first direction along a line not passing through a center of gravity of the second one-side mass body when viewed in the second direction; and
another one of the other second flexible parts connects the second other-side mass body to the internal frame in the first direction along a line not passing through a center of gravity of the second other-side mass body when viewed in the second direction.

26. An angular velocity sensor comprising:
a mass body part comprising a first mass body and a second mass body;
an internal frame supporting the first mass body and the second mass body;
a first flexible part connecting the first mass body to the internal frame;
another first flexible part connecting the second mass body to the internal frame;
second flexible parts connecting the first mass body to the internal frame;
other second flexible parts connecting the second mass body to the internal frame;
an external frame supporting the internal frame;
a third flexible part connecting the internal frame to the external frame; and
a fourth flexible part connecting the internal frame to the external frame;
wherein the second flexible part connects the first mass body to the internal frame in a first direction along a line passing through a center of gravity of the first mass body and not passing through a center of gravity of the second mass body when viewed in a second direction perpendicular to the first direction; and
the other second flexible part connects the second mass to the internal frame in the first direction along the line passing through the center of gravity of the first mass body and not passing through the center of gravity of the second mass body when viewed in the second direction.

27. An angular velocity sensor comprising:
a mass body part comprising a first mass body and a second mass body, the second mass body having a hollow part;

an internal frame supporting the first mass body and the second mass body;
a first flexible part connecting the first mass body to the internal frame;
another first flexible part connecting the second mass body to the internal frame;
a second flexible part connecting the first mass body to the internal frame;
another second flexible part connecting the second mass body to the internal frame;
an external frame supporting the internal frame;
a third flexible part connecting the internal frame to the external frame; and
a fourth flexible part connecting the internal frame to the external frame;
wherein the second flexible part connects the first mass body to the internal frame in a first direction along a line passing through a center of gravity of the first mass body when viewed in a second direction perpendicular to the first direction;
the other second flexible part connects the second mass body to the internal frame in the first direction along a line not passing through a center of gravity of the second mass body when viewed in the second direction;
wherein the first flexible part connects the first mass body to the internal frame in a third direction perpendicular to the first direction and the second direction; and
the other first flexible part connects the second mass body to the internal frame in the third direction.

* * * * *